United States Patent
Jones et al.

(10) Patent No.: US 12,202,164 B2
(45) Date of Patent: Jan. 21, 2025

(54) EDGE TRIMMING FOR MOVING-LINE FABRICATION OF AIRCRAFT

(71) Applicant: The Boeing Company, Chicago, IL (US)

(72) Inventors: Darrell D. Jones, Mill Creek, WA (US); Daniel R. Smith, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 276 days.

(21) Appl. No.: 17/454,304

(22) Filed: Nov. 10, 2021

(65) Prior Publication Data

US 2022/0152857 A1    May 19, 2022

Related U.S. Application Data

(60) Provisional application No. 63/115,046, filed on Nov. 18, 2020.

(51) Int. Cl.
*B26D 7/06* (2006.01)
*B26D 7/18* (2006.01)
(Continued)

(52) U.S. Cl.
CPC ......... *B26D 7/0625* (2013.01); *B26D 7/1863* (2013.01); *B26D 11/00* (2013.01);
(Continued)

(58) Field of Classification Search
CPC .... B26D 7/1863; B26D 7/0625; B26D 11/00; B26D 2007/0018; B64F 5/10; B23P 21/004; B23P 2700/01
See application file for complete search history.

(56) References Cited

U.S. PATENT DOCUMENTS 1,817,678 A * 8/1931 Dunseth ............... B26D 1/0006
                                                    83/435
4,018,116 A * 4/1977 Treffner ................. B26D 3/20
                                                    83/16
(Continued)

FOREIGN PATENT DOCUMENTS

CN    209522882 U    10/2019
CN    211440169 U    9/2020
(Continued)

OTHER PUBLICATIONS

Extended European Search Report dated Apr. 19, 2022 regarding EP Application No. 21207583.3; 10 pages.
(Continued)

*Primary Examiner* — Evan H Macfarlane
*Assistant Examiner* — Liang Dong
(74) *Attorney, Agent, or Firm* — Yee & Associates, P.C.

(57) ABSTRACT

Systems and methods are provided for inspecting a structure. One embodiment is a method for inspecting a structure. The method includes advancing a structure along a track in a process direction, aligning a Non-Destructive Inspection (NDI) station at the track with an edge of the structure that was trimmed upstream of the cleaning station, imaging the edge via the Non-Destructive Inspection (NDI) station, characterizing the edge based on the imaging, and advancing the structure further in the process direction via the track.

26 Claims, 21 Drawing Sheets

(51) Int. Cl.
  *B26D 11/00* (2006.01)
  *B64F 5/10* (2017.01)
  *B23P 21/00* (2006.01)
  *B26D 7/00* (2006.01)
(52) U.S. Cl.
  CPC .............. *B64F 5/10* (2017.01); *B23P 21/004* (2013.01); *B23P 2700/01* (2013.01); *B26D 2007/0018* (2013.01)

(56) References Cited

U.S. PATENT DOCUMENTS

| | | | | |
|---|---|---|---|---|
| 4,592,261 | A * | 6/1986 | Miyaji | ................ B32B 17/1099 83/788 |
| 5,301,587 | A | 4/1994 | Blaimschein | |
| 2006/0108058 | A1 | 5/2006 | Chapman et al. | |
| 2009/0095379 | A1 * | 4/2009 | Barker | ................ B23D 45/105 83/76 |
| 2011/0159229 | A1 | 6/2011 | Doehle et al. | |
| 2013/0019446 | A1 | 1/2013 | Venskus et al. | |
| 2015/0298824 | A1 | 10/2015 | Larson et al. | |
| 2016/0011593 | A1 * | 1/2016 | Oberoi | ................ B21J 15/02 901/41 |
| 2017/0080453 | A1 | 3/2017 | Pringle, IV et al. | |
| 2018/0056511 | A1 * | 3/2018 | Ayyagari | ................ B25J 5/005 |
| 2018/0071962 | A1 | 3/2018 | Klimovski et al. | |

FOREIGN PATENT DOCUMENTS

| | | | | |
|---|---|---|---|---|
| EP | 2006074 | A1 | 12/2008 | |
| EP | 2923794 | A1 | 9/2015 | |
| EP | 3061784 | A1 | 8/2016 | |
| EP | 3287228 | A1 | 2/2018 | |
| EP | 3653369 | A1 | 5/2020 | |
| EP | 3736203 | A1 | 11/2020 | |
| GB | 2383294 | A * | 6/2003 | .......... B23D 53/026 |
| WO | 9603245 | A1 | 2/1996 | |
| WO | 2006001860 | A2 | 1/2006 | |
| WO | 2009129007 | A2 | 10/2009 | |
| WO | 2013009909 | A2 | 1/2013 | |

OTHER PUBLICATIONS

Extended European Search Report dated Apr. 20, 2022 regarding EP Application No. 21207582.4; 10 pages.
Extended European Search Report dated Apr. 22, 2022 regarding EP Application No. 21207580.8; 12 pages.
Extended European Search Report dated Apr. 19, 2022 regarding EP Application No. 21207581.6; 10 pages.
Netherlands Patent Office Written Opinion and Search Report with English Translation, dated Jun. 15, 2021, regarding Application No. NL2027426; 19 pages.
Netherlands Patent Office Written Opinion and Search Report with English Translation, dated Jun. 15, 2021, regarding Application No. NL2027427; 14 pages.
Netherlands Patent Office Written Opinion and Search Report with English Translation, dated Jun. 15, 2021, regarding Application No. NL2027430; 13 pages.
Netherlands Patent Office Written Opinion and Search Report with English Translation, dated Jun. 15, 2021, regarding Application No. NL2027432; 13 pages.

* cited by examiner

EDGE TRIMMING FOR MOVING-LINE FABRICATION OF AIRCRAFT

CROSS-REFERENCE TO RELATED APPLICATION

This application claims the benefit of U.S. Provisional Patent Application Ser. No. 63/115,046 filed Nov. 18, 2020, and entitled "Edge Trimming for Moving-Line Fabrication of Aircraft" which is incorporated herein by reference in its entirety.

FIELD

The disclosure relates to the field of aircraft, and in particular, to fabrication of aircraft.

BACKGROUND

To perform edge trimming on a composite part that forms an aircraft component, the composite part is moved into a cell and scanned in detail. In this manner, the composite part is indexed and characterized within the cell and with respect to the tooling in the cell. Next, a single trimming device trims the perimeter to final part dimensions by removing manufacturing excess. Thus, trimming is performed by one trimmer carefully progressing around the entire perimeter of the composite part in a cell specifically created for only the purpose of trimming. The one trimmer works exclusively on the entire composite part at one time. No further operations may be performed at this time within this cell. The composite part is moved to another cell before further work is performed upon it and then the composite part has to be scanned to index/to perform a three-dimensional (3D) characterization of the composite part when moved to each new cell.

Therefore, it would be desirable to have a method and apparatus that take into account at least some of the issues discussed above, as well as other possible issues. That is, current manufacturing systems have a less than desired density of manufacturing operations per amount of floor space used to assemble an aircraft.

SUMMARY

Embodiments described herein provide for stations that support edge trimming stations which remove manufacturing excess from sections of aircraft fuselage that proceed in a process direction during assembly. During these processes, multiple sections of fuselage may proceed in series, in order to receive work from an edge trimming station. Furthermore, multiple edge trimming stations may be arranged in series in order to provide rough cut and fine cut operations as desired (e.g., during the same period of time at the same section of fuselage). One embodiment is a method for inspecting a structure. The method includes advancing a structure along a track in a process direction, aligning a Non-Destructive Inspection (NDI) station at the track with an edge of the structure that was trimmed upstream of the Non-Destructive Inspection (NDI) station, imaging the edge via the Non-Destructive Inspection (NDI) station, characterizing the edge based on the imaging, and advancing the structure further in the process direction via the track.

A further embodiment is a non-transitory computer-readable medium embodying programmed instructions which, when executed by a processor, are operable for performing a method for inspecting a structure. The method includes advancing a structure along a track in a process direction, aligning a Non-Destructive Inspection (NDI) station at the track with an edge of the structure that was trimmed upstream of the Non-Destructive Inspection (NDI) station, imaging the edge via the Non-Destructive Inspection (NDI) station, characterizing the edge based on the imaging, and advancing the structure further in the process direction via the track.

A further embodiment is a system for inspecting a structure. The system includes a track that contacts an edge of a structure while supporting the structure from the edge, and that enables movement of the structure in a process direction, and a Non-Destructive Inspection (NDI) station that characterizes the edge of the structure as the structure advances in the process direction via the track.

A further embodiment is a system for inspecting a structure. The system includes a structure conveyance that contacts a manufacturing excess of a structure while supporting the structure at a final trimmed edge of the structure, and that enables movement of the structure in a process direction, and a Non-Destructive Inspection (NDI) station disposed at the structure conveyance that inspects the final trimmed edge of the structure.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

BRIEF DESCRIPTION OF THE DRAWINGS

Some embodiments of the present disclosure are now described, by way of example only, and with reference to the accompanying drawings. The same reference number represents the same element or the same type of element on all drawings.

DETAILED DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

The structures described herein may comprise composite parts or metal parts. Composite parts, such as Carbon Fiber Reinforced Polymer (CFRP) parts, are initially laid-up in multiple layers that together are referred to as a preform. Individual fibers within each layer of the preform are aligned parallel with each other, but different layers exhibit different fiber orientations in order to increase the strength of the resulting composite part along different dimensions. The preform includes a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber is infused with resin prior to curing. For thermoset resins, the hardening is a one-way process referred to as curing, while for thermoplastic resins, the resin reaches a viscous form if it is re-heated.

Figure 1:
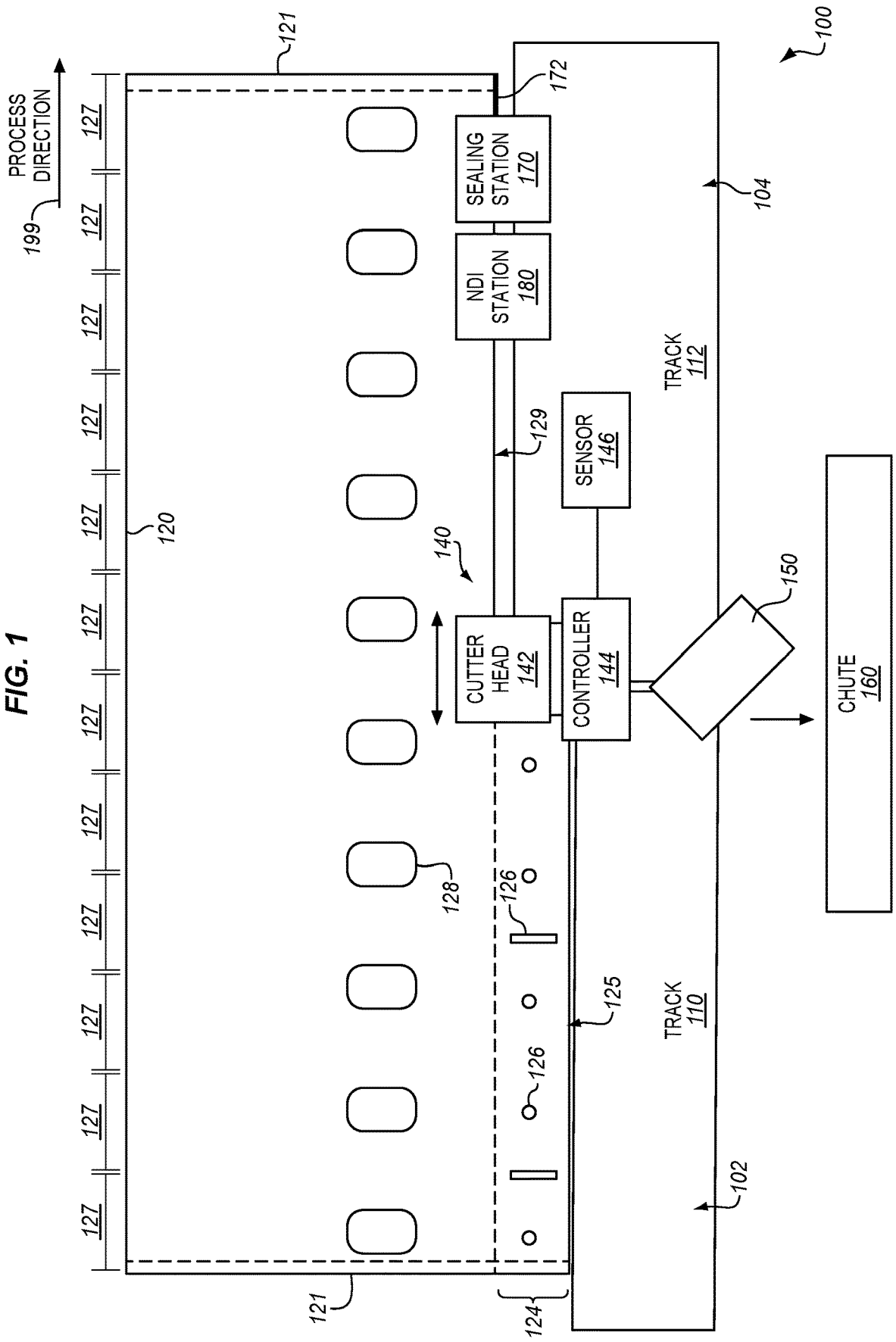
FIG. 1 is a block diagram that illustrates a line assembly system in an illustrative embodiment.

FIG. 1 is a block diagram of a line assembly system 100 that significantly increases the density of manufacturing operations per amount of floor space used to assemble an aircraft in an illustrative embodiment. Specifically, line assembly system 100 increases the number of manufacturing operations per square foot by performing multiple operations on the same section of a composite part, in addition to performing perimeter trimming during a pulse and/or during a pause between pulses.

Line assembly system 100 comprises any system, device, or component operable to iteratively pulse a structure 120 (e.g., by less than the full length of structure) along a structure conveyance 102 (e.g., track 110), and to perform work on the structure 120 while the structure 120 is paused between pulses. In further embodiments, line assembly system 100 continuously moves the structure 120 in the process direction 199 at a desired rate of speed while work is performed.

The structure 120 comprises a portion of an airframe, such as a section of fuselage. In the embodiment depicted in FIG. 1, the structure 120 comprises a half-barrel section of fuselage approximately twenty-five to forty feet long, that includes window cut-outs 128 and a manufacturing excess 124 disposed at a lower edge of the structure 120. Additional manufacturing excesses 121 may be found at leading and trailing edges of the structure 120. The manufacturing excess 124 includes a bearing edge 125 and indexing features 126, which may be utilized by upstream stations to perform work on the structure 120. In one embodiment, the bearing edge 125 and the indexing features 126 are used by multiple stations to perform work on multiple (e.g., different) portions 127 of the structure 120 that are within the purview of the multiple stations. In further embodiments, the structure 120 may comprise any suitable arcuate section of fuselage, such as one-third, one-quarter, or one-sixth barrel section of fuselage as desired. Hereinafter, arcuate sections of fuselage of any arcuate amount are referred to as "barrel" sections, while "full barrel" sections refer to sections of fuselage that comprise an arc forming a full circle (i.e., joined upper and lower half barrel sections). In still further embodiments, the structure 120 comprises a hardened composite part or a metal part, such as a section of the skin of an aircraft in which stringers and/or frames have been installed in order to enhance rigidity.

Line assembly system 100 includes a track 110, which contacts and supports the manufacturing excess 124 of the structure 120 as the structure 120 proceeds in the process direction 199. The track 110 comprises one or more rails, stanchions having rollers or grooves, or other elements that facilitate motion (e.g., rolling or sliding) of the structure 120 along the track 110 while also enforcing a desired position and/or orientation upon the structure 120. In further embodiments, the track 110 includes a chain drive, motorized cart, powered rollers, or other powered system that is capable of moving the structure 120 in the process direction 199. As the structure 120 proceeds in the process direction 199, the manufacturing excess 124 reaches an edge trimming station 140. In one embodiment, multiple edge trimming stations 140 operate upon the structure 120 during advancement of the structure 120 through the edge trimming stations 140.

The edge trimming station 140 includes a cutter head 142, such as an actuated cutting tool that is capable of motion back and forth along the process direction 199. In some illustrative examples, movement in the process direction 199 or parallel to the process direction 199 is referred to as movement horizontally. In some illustrative examples, cutter head 142 operates horizontally to remove a manufacturing excess 124 from a structure 120. A controller 144 controls the operations of the edge trimming station 140, for example by activating a cutter (e.g., a reciprocating blade, circular blade, punch, etc.) at the cutter head 142, moving the cutter head 142, receiving input from sensor 146 (e.g., a motion sensor, laser, ultrasonic, or visual positioning sensor, etc.) indicating pauses between pulses of the structure 120, etc. The indexing/characterizing discussed herein ensures that trimming is performed in desired locations. In one embodiment, the trim includes a joggle that is located during indexing. The method of indexing for each downstream assembly station will be dependent on the requirements of location accuracy necessary for the type of work being performed. As an example, a window frame installation location may have more forgiving tolerances, as no further structural integrations happen after window frame installation. In contrast, frames are integrated with other frames and floors, so their location requirements are more tightly controlled. The indexing features 126 may convey specific instructions for specific operations. For example, location, configuration and type may convey a particular instruction. In this case, the indexing feature helps locate the half fuselage relative to the trim line at each pulse just before being trimmed off as part of the pulse process.

In this embodiment, the edge trimming station 140 is configured for insertion into grasping, or otherwise fitting with an indexing feature 126. During assembly, structure 120 is pulsed a distance (e.g., a distance at least equal to the shortest distance between indexing features 126, a frame pitch, a distance equal to a length of each portion 127, etc.), and is indexed to the edge trimming station 140 as the cutter head 142 works upon the structure 120. The track 110 enforces a desired position of the structure 120 into/out of the page. Furthermore, whenever the indexing features 126 in the structure 120 and the edge trimming station 140 are mated, the location of the structure 120 is indexed to a known location in a coordinate space shared by the track 110 and the cutter head 142. Furthermore, indexing also bears forces which are transferred through structure 120 from one side to the other, enforcing a loft in the structure 120 and causing the structure 120 to retain desired loft. Phrased another way, any forces applied by sides of the structure 120 to bow outward are resisted by the track 110, resulting in an arch shape being retained, enabling the track 110 to enforce compliance with a desired loft, Inner Mold Line (EVIL), and/or Outer Mold Line (OML). This also prevents twists from being introduced to the structure 120 during pulses. In further embodiments, structure 120 retains a desired EVIL and/or OML shape without the external application of force (i.e., beyond any force applied by rollers to advance the structure 120 along track 110). In any case, the structure 120 is in conformance with a desired IML and/or OML when it receives work from an edge trimming station 140. Specifically, the act of indexing the structure 120 to the edge trimming station 140 causes the position of the structure 120 relative to the edge trimming station 140 to be known. In this manner, the 3D characterization of the structure 120 within the purview of the station is conveyed to the station without the need to scan the structure 120 at each station stop. The width of the track 110 along with the shape of the barrel section, and the delaying of performing cut-outs until after installation of the frames and window and door surrounds, and possibly other means of maintaining the desired curvature, help to ensure that the section configuration is as desired when indexed at a particular station and also helps to maintain a desired rigidity/stiffness.

In one embodiment, indexing is performed at least according to the following description. A structure 120 in the form of a barrel section is carried upon a track 110. The track 110 may comprise elements such as powered rollers mounted to a discrete series of stanchions arranged in a process direction 199, rails (e.g., mounted to the floor or elevated above the floor), etc. The elements of the track 110 are positioned in known locations. The barrel section has been fabricated on a layup mandrel according to precise dimensions. Furthermore, the mandrel has precise features which aid in locating features in the manufacturing excess 124 of the barrel section, and this precise layup enables indexing features 126 to be precisely located in a manufacturing excess 124 of the barrel section. At this stage, in one embodiment. a Radio Frequency Identifier (RFID) chip is placed in the manufacturing excess 124. Once the barrel section is located on the precisely located track elements (and possibly an additional Inner Mold Line (IML) or Outer Mold Line (OML) forcing tooling disposed upstream or downstream of the station), the 3D position and IML or OML loft of the barrel section is precisely known when the indexing feature is engaged, without the need for a full scan via probes or optical technology at each station.

The relative stiffness of the de-molded or otherwise formed barrel section can be relied upon to help the barrel section maintain a desired loft/IML/OML along with the precisely located track elements that facilitate conveyance of the barrel section and without the need for any substantial shape defining tooling during pulsed assembly. In this arrangement, the features are located precisely into the barrel section relative to the loft/IML/OML of the structure 120 and the precisely located track elements help convey the barrel section from station to station without distortion. Therefore, a 3D position and orientation of the barrel section (e.g., including loft/IML/OML) is known quickly and precisely (i.e., indexed) after each pulse without the need to re-scan the barrel section each time.

Because of the precise indexing performed, the cutter head 142 at the edge trimming station 140 is able to know exactly where they are relative to the barrel section when the barrel section is locked into place. The 3D position and orientation, and/or the loft/IML/OML of the barrel section is then established or indexed into any Numerical Control (NC) programming or automated system in use at the station. Therefore, no setup time or scanning is needed after each pulse of the barrel section. Furthermore, structure added to or removed from the barrel section in the prior station may be added to whatever barrel section model or representation is within the system, without the need to scan the barrel section for the changes. Manufacturing excess 124 is cut from the structure 120, resulting in scrap 150 of any suitable length or size (e.g., a length equal to a pulse length or a fraction thereof), which is removed from the structure 120 and dropped into chute 160 (e.g., a gravity chute). The scrap 150 comprises the manufacturing excess 124 that was removed.

This removes indexing features 126 that were utilized by upstream stations that performed work upon the structure 120 and/or by the edge trimming station 140. The indexing features 126 are separated when the manufacturing excess 124 is trimmed back to a trim edge (e.g., an intermediate trim edge, or final trimmed edge 129). Removing the manufacturing excess 124 separates indexing features 126, that were utilized by upstream stations that performed work on the structure 120, from the structure 120. The structure 120 proceeds in the process direction 199 after the trimming has been completed, resulting in final trimmed edge 129. Portions 127 of the structure 120 that are downstream of the edge trimming station 140 are carried along a second structure conveyance 104 comprising an additional, second track 112, which has a different height than track 110. That is, the second structure conveyance 104 is of a second height that enables movement of the structure 120 in a process direction 199 and that is greater than the first height, and is disposed downstream of the structure conveyance 102. The difference in height corresponds to the height of manufacturing excess 124 after it has been trimmed off. For example, the second track 112 may include stanchions that are dimensioned to support the structure 120 at the final trimmed edge 129 which has been trimmed. The edge trimming station 140 therefore leaves a final trimmed edge 129 that accommodates splicing and is in contact with the second structure conveyance 104. Thus, track 110 operates as a first track that bears a manufacturing excess 124 (e.g. including, bearing edge 125) of a structure 120 while supporting the structure 120, and that enables movement of the structure 120 in a process direction 199. The second track 112 operates to bear a trimmed edge (e.g., another bearing edge, or a final trimmed edge 129) of the structure 120 while supporting the structure 120, and that enables movement of the structure 120 in a process direction 199 after the manufacturing excess 124 has been removed. In these illustrative examples, the methods comprise placing a final trimmed edge 129 of the structure 120 in contact with a track 112 of a structure conveyance 104 such that the track 112 supports the structure 120 from the final trimmed edge 129. The second track 112 is taller than the track 110 by a height of the manufacturing excess 124. Furthermore, when the structure 120 comprises a half-barrel section of fuselage, the first track 110 supports a manufacturing excess 124 on each side of the half-barrel section and the second track 112 supports a final trimmed edge 129 on each side of the half-barrel section.

The operations of the edge trimming station 140 are managed by controller 144. In one embodiment, controller 144 determines a progress of the structure 120 along the track 110 (e.g., based on input from a technician or sensor 146) and a position/orientation of the structure 120 relative to the edge trimming station 140 (e.g., using the same indexing system as upstream fabrication stations), and uses this input to manage the operations of the edge trimming station 140 in accordance with instructions stored in a Numerical Control (NC) program. For example, the controller 144 may alter instructions in an NC program for the edge trimming station 140 to accommodate any deviations in position of the structure 120 from a nominal position and orientation. Controller 144 may be implemented, for example, as custom circuitry, as a hardware processor executing programmed instructions, or some combination thereof.

An edge sealing station 170 is also depicted in FIG. 1. The edge sealing station 170 applies an edge sealant 172 to the final trimmed edge 129 which has been freshly cut. The sealant 172 protects the final trimmed edge 129 from abrasion and arrests the propagation of inconsistencies from the final trimmed edge 129. A Non-Destructive Inspection (NDI) station 180 operates an ultrasonic, visual, or laser sensor in order to scan the final trimmed edge 129 for out-of-tolerance conditions (e.g., voids, chips, etc.). The Non-Destructive Inspection (NDI) station 180 is upstream of the edge sealing station 170 to observe the final trimmed edge 129 before it is sealed.

Illustrative details of the operation of line assembly system 100 will be discussed with regard to FIG. 2. Assume, for this embodiment, that a structure 120 has started pulsing in the process direction 199 by less than its length.

Figure 2:
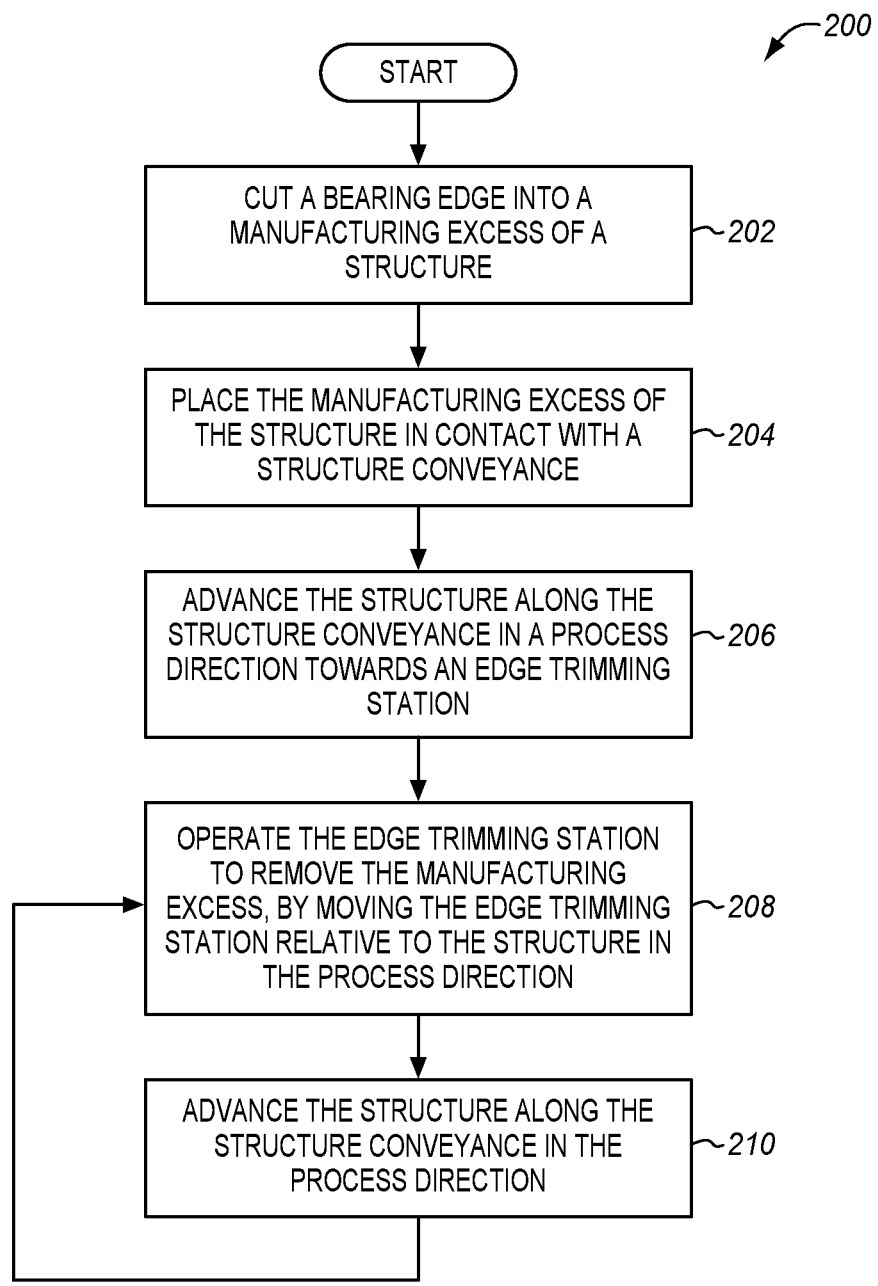
FIG. 2 is a flowchart illustrating a method for edge trimming a structure in an illustrative embodiment.

FIG. 2 is a flowchart illustrating a method 200 for edge trimming a structure (e.g., structure 120) in an illustrative embodiment. The steps of method 200 are described with reference to line assembly system 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, a bearing edge 125 is cut into a manufacturing excess 124 of a structure 120. This may comprise cutting the structure 120 before the structure 120 is demolded from a layup mandrel (not shown) in order to remove a flash edge comprising resin and/or excess fibers from the structure 120. The bearing edge 125 will be borne by the track 110 as fabrication continues and the structure 120 is carried in the process direction 199. Utilizing the manufacturing excess 124 as a bearing edge 125 (and/or to retain indexing features 126 or RFID chips bearing instructions for downstream stations) enables the manufacturing excess 124 to provide value during the fabrication process. That is, unlike prior systems that would trim the manufacturing excess 124 as a waste product that added no value, the present techniques provide a manufacturing excess 124 with value by facilitating tooling and manufacturing processes in a post-cure environment. This technique provides an added benefit by protecting a final trimmed edge 129 of a composite part from receiving damage during transportation.

In step 204, a manufacturing excess 124 of the structure 120 is placed in contact with a structure conveyance 102 (e.g., track 110). Thus, track 110 supports and guides the structure 120 by bearing the manufacturing excess 124. The manufacturing excess 124 may be placed within a notch or groove defined by supports at the track 110, and may rest upon rollers at the track 110 that facilitate movement of the structure 120 in the process direction 199.

In step 206, the structure 120 is advanced along the structure conveyance 102 (e.g., track 110) in a process direction 199 towards the edge trimming station 140. This may comprise operating a system that drives the track 110, or a system that pushes or pulls the structure 120 along the track 110. In some illustrative examples, advancing the structure 120 along the track 110 in the process direction 199 comprises pulsing the structure 120 in the process direction 199. In some illustrative examples, advancing the structure 120 along the track 110 in the process direction 199 comprises moving the structure 120 continuously in the process direction 199. The structure 120 may be pulsed (e.g., "micro-pulsed" by less than its length) a predefined distance (e.g., a frame pitch indicating a distance between installed frames) and then paused, or may be continuously moved along the track 110. During this process the track 110 may hold the structure 120 at a specific height (e.g., to within a tolerance such as a thousandth of an inch), or the edge trimming station 140 may operate a sensor 146 to detect a height of the structure 120, and then adjust a height of the cutter head 142 to align a cutter to a desired position to create the final trimmed edge 129, or even utilize the indexing features 126.

In step 208, for each side of the structure 120, an edge trimming station 140 is operated to remove the manufacturing excess 124 (including the bearing edge 125) from a side of the structure 120. Thus, manufacturing excess 124 on both the left and right side of the structure 120 are trimmed during the same pause or advancement of the structure 120. In one embodiment, the trimming occurs during motion of the structure 120 over a cutter that is fixed in position, while in another embodiment, trimming is performed by a cutter that moves longitudinally relative to the structure 120 during a pause. In one embodiment, the sides are trimmed by two different cutters (one for each side), which is an advancement over the prior art that utilized one cutter working the entire edge in a dedicated cell after scanning the structure 120 and indexing it to the cutter.

Step 208 may comprise driving the cutter head 142 against the process direction 199 or back and forth along the process direction 199 while a cutter at the cutter head 142 is active. The edge trimming operation may be performed in a pause between pulses, during movement (e.g., micro-pulsed movement) of the structure 120 between pauses, during pulses, or during continuous movement of the structure 120. That is, one embodiment utilizes a cutter head 142 that is stationary, with the cutting pass occurring during the pulsed movement in the process direction 199. When the cutter head 142 is stationary, the manufacturing excess 124 is removed by a fixed cutter when the structure 120 is pulsed forward. Pulses may be performed as "micro pulses" at a frame pitch length so each trimmed off portion is cut to length at the end of the pulse (or cut multiple times to a length less than a micro pulse length, or even one time by up to a full pulse length) and then dropped into the chute 160. Edge trimming station 140 removes the manufacturing excess 124 by moving relative to the structure 120 in the process direction 199, moving relative to the structure 120 against the process direction 199, or remaining stationary as the structure 120 advances in the process direction 199 along the structure conveyance 102. A separate vertical cutter may be used to cut to length or the same cutter may be used to cut to length. The cutting may begin during each pulse with the cutter head 142 cycling in a direction opposite to the process direction 199 during the stationary period between pulses in a similar manner to the carriage of a typewriter. In further embodiments, it is possible to seal at the edge sealing station 170, or via integrated machinery disposed at the edge trimming station 140 during the pause in the pulsing.

In a further embodiment, the Non-Destructive Inspection (NDI) station 180 and/or edge sealing station 170 are integrated into cutter head 142, such that a single sweep of the cutter head 142 cuts, inspects, and seals as desired. In further embodiments, a Non-Destructive Inspection (NDI) scan and/or sealing are performed while the structure 120 is pulsed (e.g., micro-pulsed), during a pause, or while the structure 120 is continuously moved, and the heads for performing the Non-Destructive Inspection (NDI) scan and/or sealing are fixed in position.

In one embodiment, the cutter head 142 proceeds vertically after a predefined distance (e.g., after a multiple or fraction of a pulse length, such as a length corresponding with a micro pulse) in order to cut the scrap 150 into sections of manageable length. In further embodiments, the cutter head 142 utilizes a separate cutter to vertically cut the scrap 150 off of the manufacturing excess 124, or utilizes a clamping tool (not shown) to snap off pieces of the manufacturing excess 124. In still further embodiments, a weight of the scrap 150 induced by gravity causes the scrap 150 to separate from the manufacturing excess 124. The scrap 150 drops into chute 160 for disposal. Chute 160 is disposed beneath the edge trimming station 140.

In step 210, the structure 120 advances in the process direction 199 along the structure conveyance 102. That is, the structure 120 downstream of the cutting station (e.g., edge trimming station 140) is transported at a height needed to bear upon the final trimmed edge 129 while the structure upstream of the cutting station (e.g., edge trimming station 140) is transported at a height needed to bear upon the manufacturing excess 124. For example, the structure 120 may be pulsed a distance equal to a frame pitch or other distance. Advancing the structure 120 in the process direction 199 exposes further manufacturing excess 124 to the edge trimming station 140, and/or to any Non-Destructive Inspection (NDI) station 180 and sealant application station. Steps 206-208 may be iteratively performed until the manufacturing excess 124 has been completely removed, a final trimmed edge 129 has been completely Non-Destructive Inspection (NDI) inspected and edge sealed, and the structure 120 has proceeded its entire length through the edge trimming station 140, and any Non-Destructive Inspection (NDI) stations 180 and sealant application stations (e.g., edge sealing station 170).

Method 200 provides a technical benefit over prior techniques, because it causes transit time for a large composite part to be value-added time wherein fabrication and/or assembly continue as the part is transported. Thus, the act of fabrication is integral with the act of transportation, which means that time being transported is also time being worked upon. Furthermore, because the operations of the stations are synchronized in accordance with a takt time (i.e., their timing is based on a desired fabrication rate for an aircraft or portion thereof) in one or more embodiments, the stations are capable of being operated in tandem to increase work density. This reduces the overall production time for aircraft, which reduces expense. Furthermore, method 200 provides a unique technique by which edge trimming may be performed for components of an aircraft in a moving assembly line.

Figure 3:
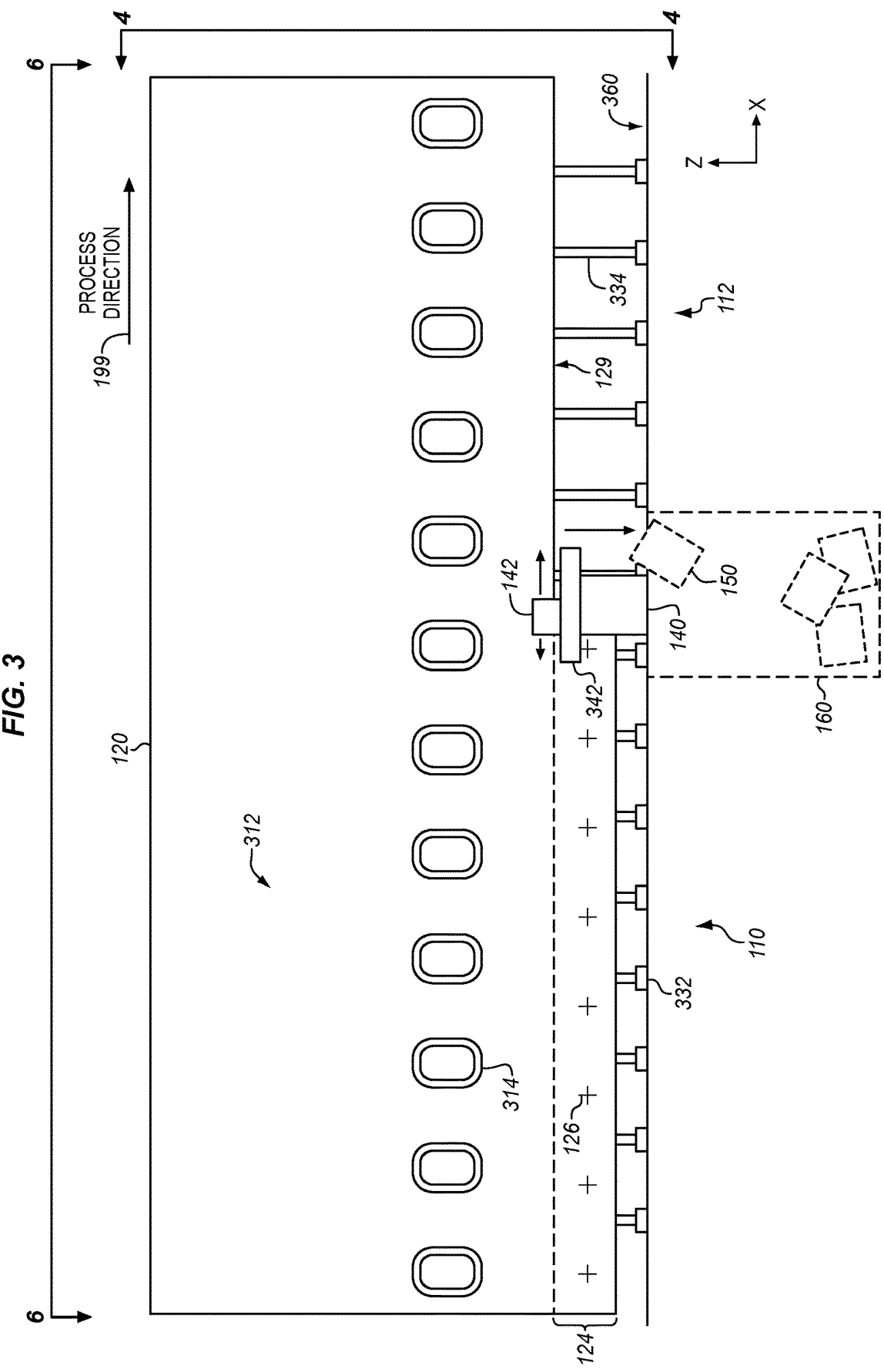
FIGS. 3-4 illustrate an edge trimming station removing material from a structure in an illustrative embodiment.
Figure 4:
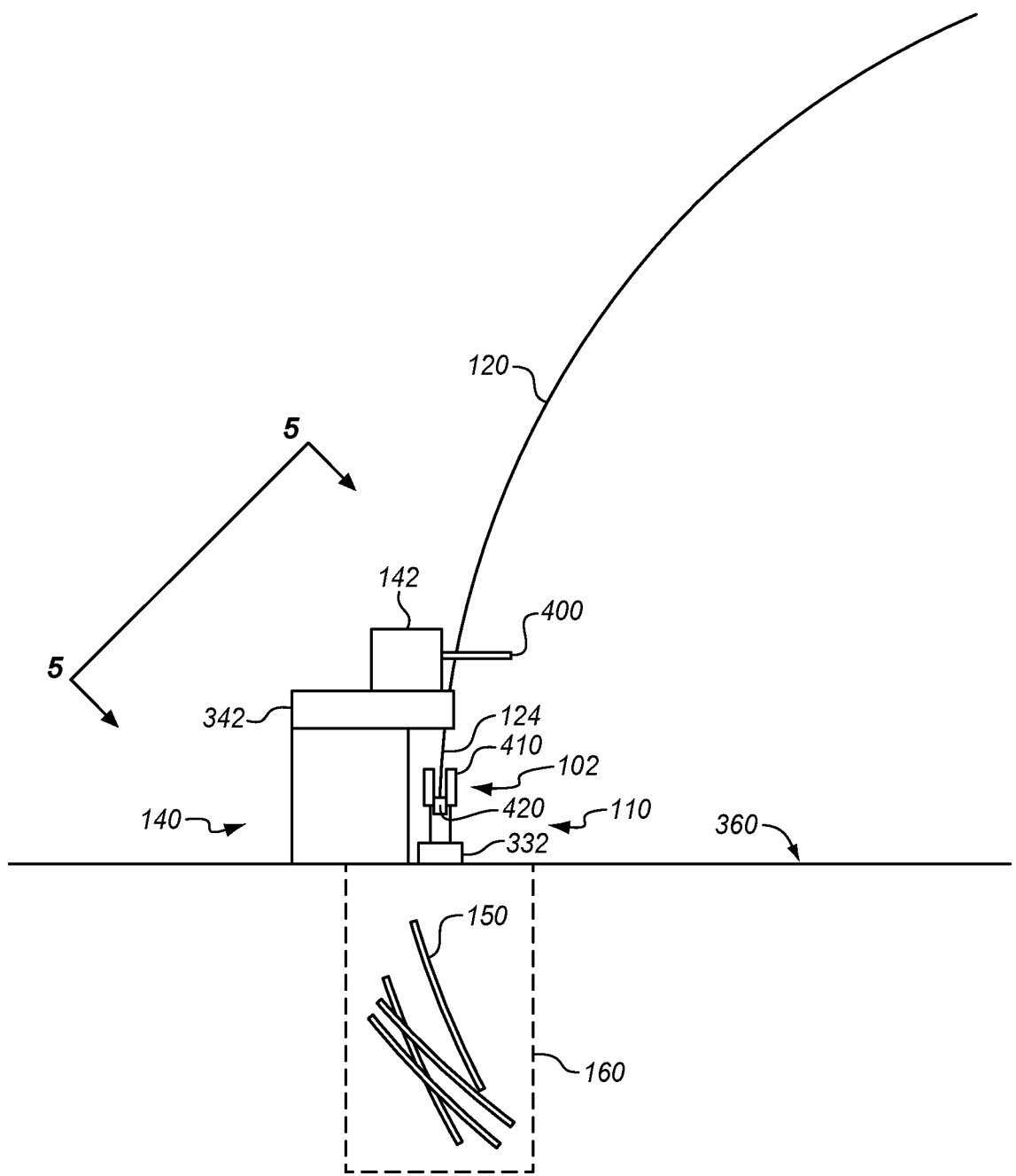

FIGS. 3-4 illustrate an edge trimming station 140 removing material from a structure 120 in an illustrative embodiment. The edge trimming station 140 may cut one side of the structure 120, while another edge trimming station 140 simultaneously cuts the other side of the structure 120. In this embodiment, the structure 120 comprises a half-barrel section of fuselage that has been reinforced by stringers, frames, and window surrounds. The structure 120 includes a surface 312, into which manufacturing excess 124 for windows 314 (e.g., window cut-outs 128 in FIG. 1) has been removed. The structure 120 also includes indexing features 126 (e.g., holes, slots, RFID chips, etc.) disposed within a manufacturing excess 124.

The structure 120 is carried upon a track 110 at floor 360. The track 110 includes stanchions 332 (also referred to herein as "pogos") of a first height, and second track 112 includes stanchions 334 of a second height that enables movement of the structure 120 in a process direction 199. The stanchions 334 are taller than the stanchions 332 by a height of the manufacturing excess 124. That is, pogos/stanchions 334 disposed downstream of the edge trimming station 140 are taller than pogos/stanchions 332 disposed upstream of the edge trimming station 140. Although not depicted in the Figures, in some illustrative examples, the track 112 comprises stanchions 334 that each comprises a support that holds the structure 120 in a position; and a roller that enables the structure 120 to move in the process direction 199 while held by the support.

During advancement of the structure 120, or during a pause between pulses of the structure 120, individual stations index themselves to one or more indexing features 126 at the structure 120, such as indexing features 126. This enables the stations to determine their precise position relative to the structure 120, and to characterize portions 127 (depicted in FIG. 1) of the structure 120 that are within the purview of the station. In this manner, the stations are capable of performing work accurately and precisely at the structure 120, by reference to the indexing features 126.

The edge trimming station 140 includes a cutter track 342 along which a cutter head 142 moves. In another embodiment, a stationary cutter performs a cutting pass during the pulsed movement of the structure 120 in the process direction 199. Pulses may be performed at a frame pitch length or other distance, such that each trimmed off portion is cut to length at the end of the pulse and then dropped into the chute 160. A pulse equal to the length of the structure 120 is referred to as a "full pulse," while a pulse less than a length of the structure 120 (e.g., a frame pitch distance) is referred to as a "micro pulse." The cutter head 142 proceeds back and forth by sliding along the cutter track 342 in the process direction 199. In some illustrative examples, movement in the process direction 199 or parallel to the process direction 199 is referred to as movement horizontally. In some illustrative examples, cutter head 142 operates horizontally to remove a manufacturing excess 124 from a structure 120. The cutter head 142 cuts the manufacturing excess 124 off in sections of scrap 150, and this scrap 150 accumulates in chute 160. The structure 120 exhibits a final trimmed edge 129 after proceeding through the edge trimming station 140. The final trimmed edge 129 may provide the structure 120 with desired dimensions for the structure 120 at which the structure 120 will be integrated with another structure 120 (e.g., another section of fuselage). That is, the final trimmed edge 129 may be trimmed to final manufacturing dimensions. In one embodiment, multiple stations (e.g., for trimming, cleaning, Non-Destructive Inspection (NDI) inspection, and/or edge sealing) perform work or otherwise operate upon the structure 120 (e.g., at different portions 127 of its length) during a pause in advancement of the structure 120.

FIG. 4 is a back view of the edge trimming station 140, and corresponds with view arrows 4 of FIG. 3. According to FIG. 4, the edge trimming station 140 includes a blade 400 that protrudes from the cutter head 142. The blade 400 is positioned at a height desired for the trim edge of the structure 120 that is being cut. While the blade 400 is illustrated as a reciprocating blade in FIG. 4, in further embodiments the blade 400 comprises a circular blade, laser cutter, pressurized water cutter, or other cutting implement. FIG. 4 also illustrates that each stanchion 332 includes supports 410 which define a groove for receiving the manufacturing excess 124, as well as a roller 420 for bearing the manufacturing excess 124. The structure conveyance 102 is a track 110 that comprises stanchions 332 that each comprise a support 410 that holds the structure 120 in a position; and a roller 420 that enables the structure 120 to move in the process direction 199 while held by the support. Although FIG. 4 depicts the stanchions 332 of the track 110, in some illustrative examples, the track 112 also comprises stanchions 334 that each comprise: a support that holds the structure 120 in a position; and a roller that enables the structure 120 to move in the process direction 199 while held by the support.

Figure 5:
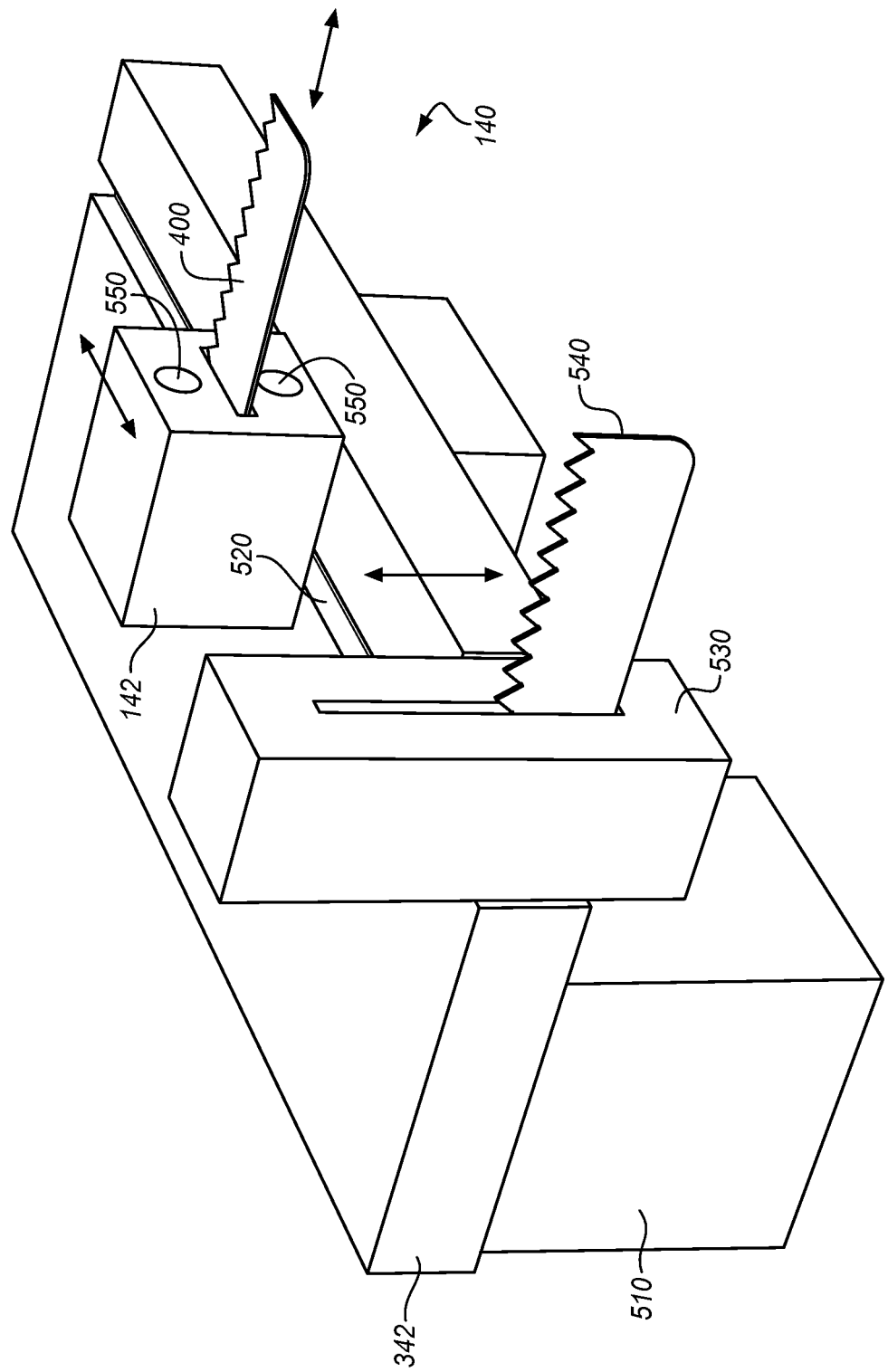
FIG. 5 is a perspective view of an edge trimming station in an illustrative embodiment.

FIG. 5 is a perspective view of an edge trimming station 140 in an illustrative embodiment, and corresponds with view arrows 5 of FIG. 4. FIG. 5 illustrates frame 510 which bears cutter track 342, and further illustrates a groove 520 which cutter head 142 slides along at cutter track 342. FIG. 5 further illustrates vacuum slots 550 at the cutter head 142, which apply suction to remove dust and debris as cuts are made via blade 400. A vertical cutter head 530 is also depicted in FIG. 5. The vertical cutter head 530 is disposed downstream of the cutter head 142, and proceeds vertically upwards to cut hanging amounts of the manufacturing excess 124 into sections of scrap 150 in FIG. 1. The vertical cutter head 530 segments the manufacturing excess 124 that has been removed into scrap 150 of predetermined lengths. The vertical cutter head 530 includes a blade 540 which rests beneath an edge of the manufacturing excess 124, and proceeds vertically up to the edge being cut by the cutter head 142. The vertical cutter head 530 therefore applies vertical cuts to the manufacturing excess 124 to enable the manufacturing excess 124 to be removed in predetermined lengths. These vertical cuts may be applied before or after operation of the cutter head 142. The cutter head 142 and the vertical cutter head 530 operate collaboratively (i.e., to cut out segments without interfering with each other) to remove manufacturing excess 124.

Figure 6:
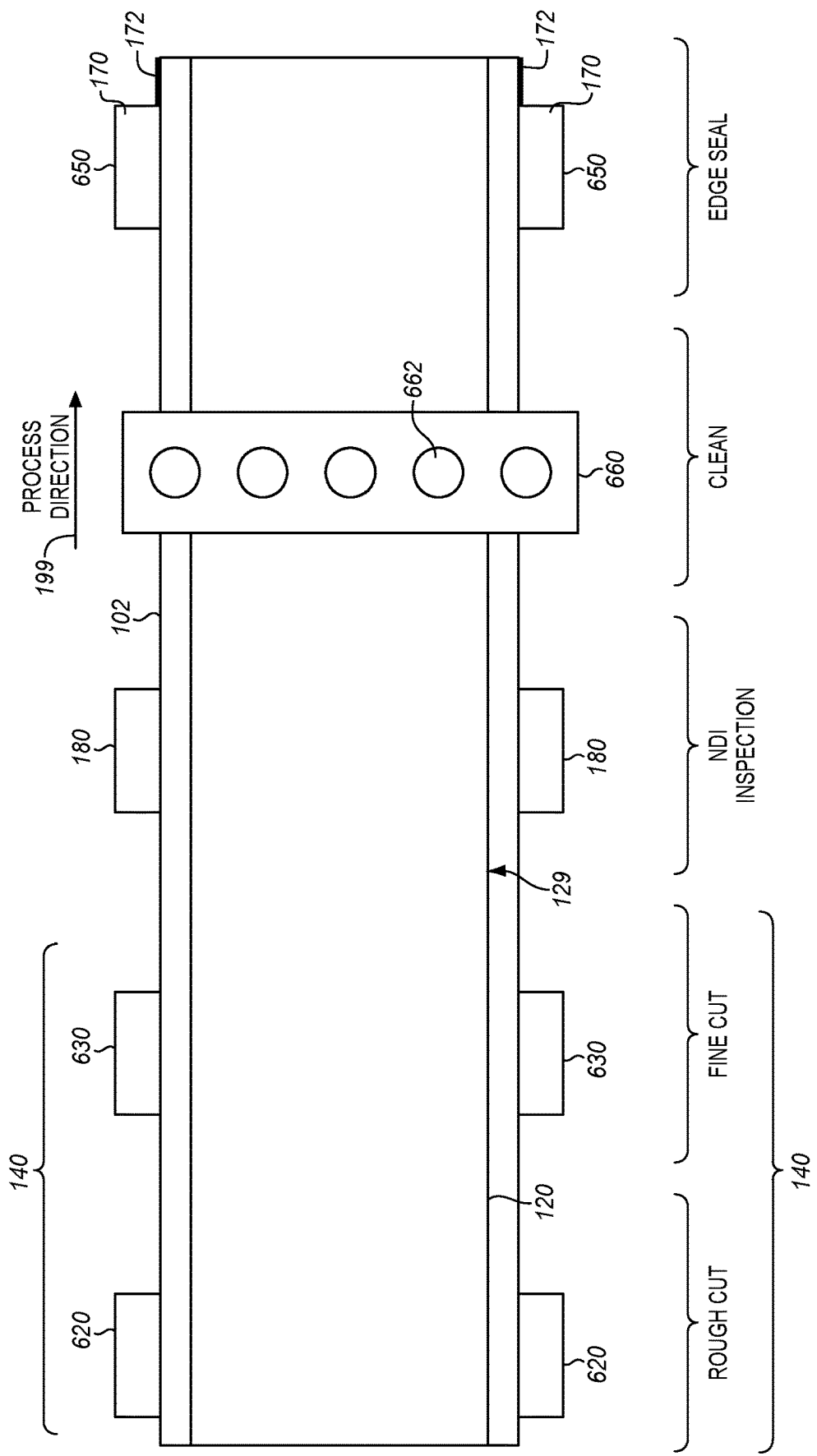
FIG. 6 is a top view of a series of stations that facilitate edge trimming, inspection, cleaning and sealing in an illustrative embodiment.

With a discussion provided above of specific implementations of edge trimming stations 140, FIG. 6 illustrates arrangements of edge trimming stations 140 with respect to other stations in an assembly environment. Specifically, FIG. 6 is a top view of a series of stations that facilitate edge trimming, inspection, cleaning and sealing in an illustrative embodiment. In FIG. 6, a structure 120 is pulsed in a process direction 199 along a structure conveyance 102 (e.g., a track 110). In the illustrated example, edge trimming stations 140 might include a rough edge trimming station 620 and a fine edge trimming station 630. Rough edge trimming stations 620 perform an initial cut within a first tolerance (e.g., a tenth of an inch) to remove manufacturing excess 124 from sides of the structure 120. It is possible to have all rough edge trimming completed in one station, or even in one pass of the rough edge trimming station 620. Fine edge trimming stations 630 perform a fine cut to place the edges into conformance with a predetermined tolerance (e.g., a tighter tolerance than was used for rough edge trimming, such as to within a fraction of an inch). In some illustrative examples, methods comprise operating the fine edge trimming station 630 to trim additional material from an edge of the structure 120. In some illustrative examples, the fine edge trimming station 630 operates to trim the structure 120 to a final trimmed edge 129. Non-Destructive Inspection (NDI) stations 180 comprise devices which perform ultrasonic, laser, or visual inspection of the trimmed edges for delaminations or other out-of-tolerance conditions. Cleaning station 660 removes dust and debris from the structure 120, for example by brushing, blowing, or rinsing the structure 120 with a liquid cleaning solution. Cleaning station 660 cleans the final trimmed edge 129. This may comprise operating elements 662 in the form of air knives, sprayers, brushes, etc. One example of an edge sealing station 170 is illustrated as a chemical edge sealing station 650. A cleaned portion of the structure 120 reaches chemical edge sealing stations 650, which seals the edge with a chemical sealant, such as sealant 172. That is, the chemical edge sealing stations 650 seal a final trimmed edge 129 of the structure 120. Further stations, such as painting stations may follow the stations discussed above.

Figure 7:
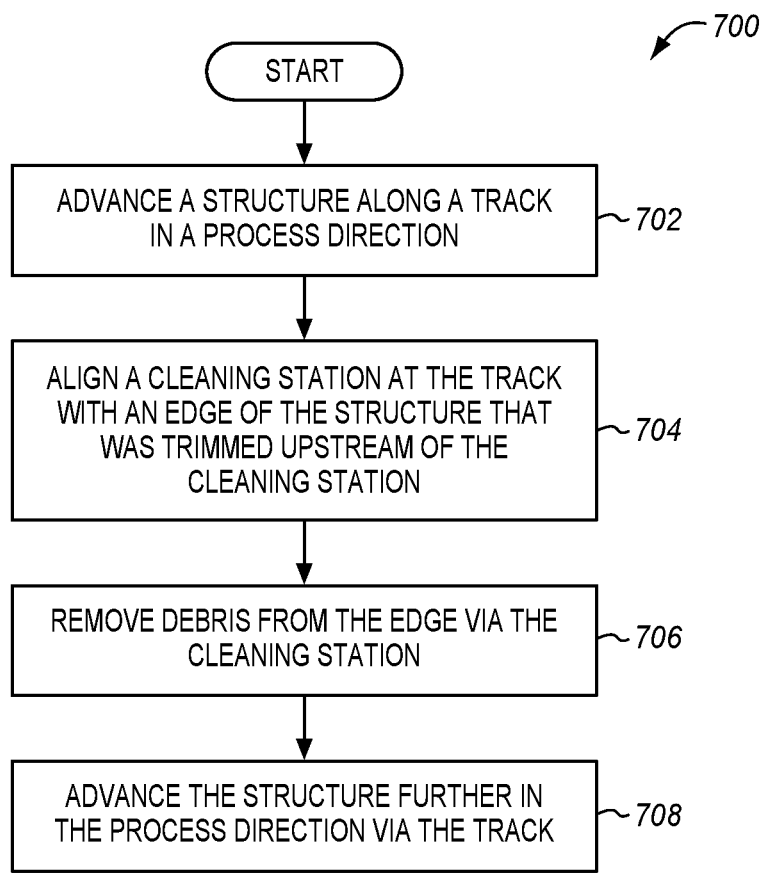
FIG. 7 is a flowchart illustrating a method for cleaning a structure in an illustrative embodiment.

FIG. 7 is a flowchart illustrating a method 700 for cleaning a structure 120 in an illustrative embodiment, and is described with regard to FIG. 8 below. The method 700 includes advancing a structure 120 along a track 830 in a process direction 199 in step 702. This may be performed continuously or in a pulsed fashion. In some illustrative examples, advancing the structure 120 along the track 830 in the process direction 199 comprises pulsing the structure 120 in the process direction 199. In some illustrative examples, advancing the structure 120 along the track 830 in the process direction 199 comprises moving the structure 120 continuously in the process direction 199. Method 700 further includes aligning a cleaning station 660 at the track 830 with an edge, such as a final trimmed edge 129 of the structure 120 that was trimmed upstream of the cleaning station 660 in step 704, and removing debris from the edge via the cleaning station 660 in step 706. Removing debris may comprise applying a fluid to the edge that carries the debris from the edge, or may comprise brushing the edge. In one embodiment, the cleaning station 660 removes debris from an entire contour (e.g., an entire cross-section, including EVIL and/or OML) of the structure 120, or within a threshold distance (e.g., within one inch, within twelve inches, etc.) of the final trimmed edge 129. For example, the cleaning station 660 may comprise a ring-like fixture disposed at an IML and/or OML of the structure 120, which scours the entire structure 120 via brushes and/or sprayers. Debris removal may be performed via sweeping application of pressurized air or pressurized liquid, and/or via abrasion with scrubbing heads. In step 708, the structure 120 is advanced further in the process direction 199 via the track 830. In further embodiments, fluid is sprayed at an upstream angle (e.g., at forty-five degrees into the structure 120), such that dust does not accrue downstream of the cleaning station 660. Applied fluid may be captured via a drain 852.

In a further embodiment, the structure 120 is pulsed in the process direction 199, and removing debris is performed during pauses between pulses or performed during pulses. In a further embodiment, the structure 120 is moved continuously in the process direction 199, and removing debris is performed as the structure 120 is moved continuously.

Figure 8:
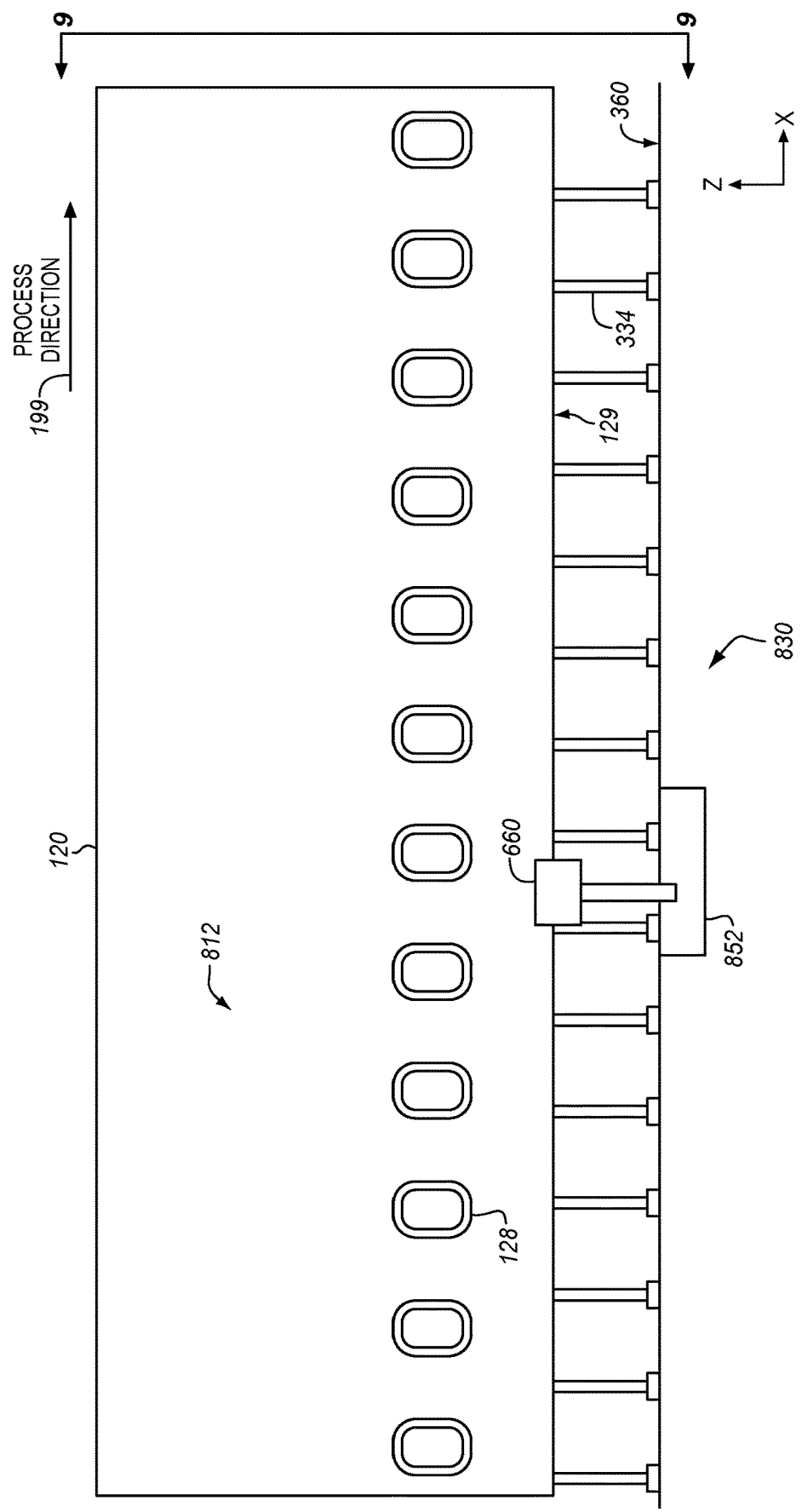
FIGS. 8-9 illustrate a cleaning station sealing an edge of a structure in an illustrative embodiment.
Figure 9:
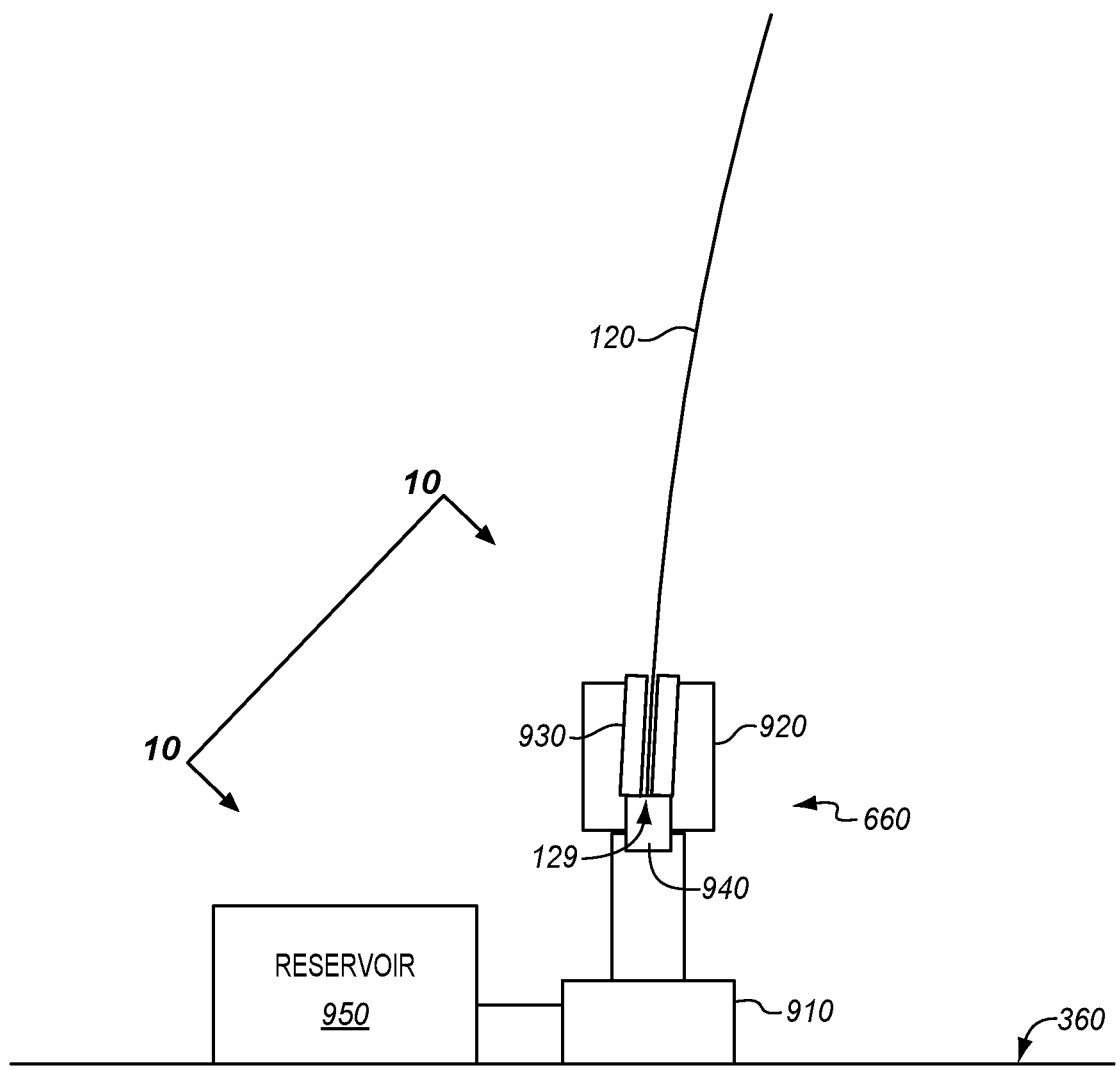

FIGS. 8-9 illustrate a cleaning station 660 sealing an edge of a structure in an illustrative embodiment. FIG. 8 illustrates a cleaning station 660 cleaning a final trimmed edge 129 of a structure 120 having a contour 812 and window cut-outs 128 in an illustrative embodiment. The structure 120 is carried by its final trimmed edge 129 across a track 830 (e.g., additional track or second track 112 in FIG. 1) comprising multiple stanchions 334 at a floor 360. During advancement of the structure 120 (e.g., during a pulse), or during a pause between pulses of the structure 120, the cleaning station 660 indexes itself to one or more indexing features at the structure 120. This enables the cleaning station 660 to determine its precise position relative to the structure 120, and to characterize the structure 120. In this manner, the cleaning station 660 is capable of performing work accurately and precisely at the structure 120, by reference to the indexing features. In a further embodiment, the cleaning station 660 performs work based on indexing performed by upstream stations.

Figure 10:
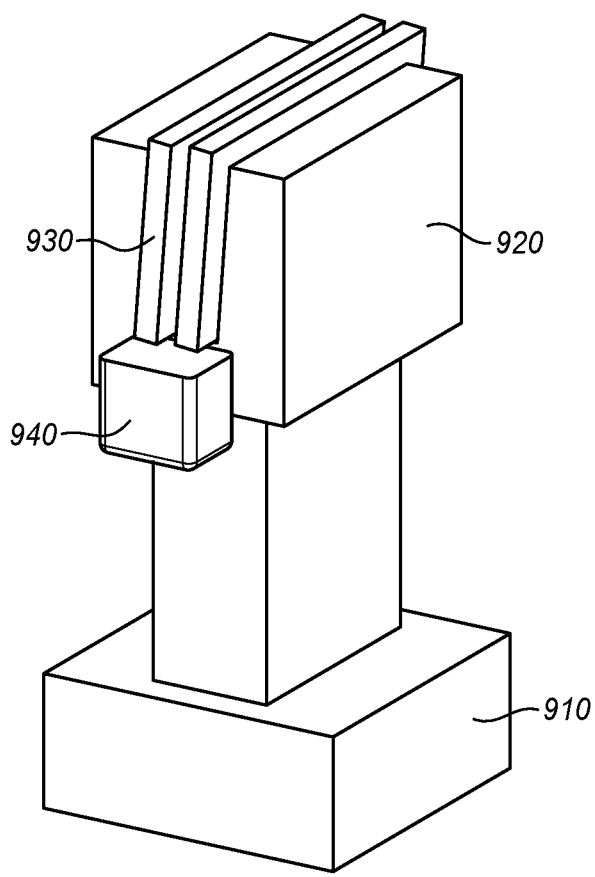
FIG. 10 is a perspective view of a cleaning station in an illustrative embodiment.

FIG. 9 corresponds with view arrows 9 of FIG. 8, and illustrates that the cleaning station 660 includes a base 910, and prongs 920 which support the cleaning heads 930. Cleaning heads 930 may comprise brushes that scour the edge (e.g., passive brushes, actively driven brushes, etc.), air knives that apply pressurized air to sweep the final trimmed edge 129 with air, sprayers/spray heads that apply fluids such as cleaning fluids to the edge, any suitable combination thereof, etc. Fluid such as pressurized air or liquids is acquired from reservoir 950 and applied to the final trimmed edge 129. Excess fluid is captured and disposed of via reserve 940. FIG. 10 is a perspective view of a cleaning station corresponding with view arrows 10 of FIG. 9.

As illustrated in FIGS. 8-10, the cleaning station 660 includes a track 830 that contacts final trimmed edge 129 of a structure 120 while supporting the structure 120 from the final trimmed edge 129, and that enables movement of the structure 120 in a process direction 199. The cleaning station 660 removes debris from the final trimmed edge 129 of the structure 120 as the structure 120 advances in the process direction 199 via the track 830.

Figure 11:
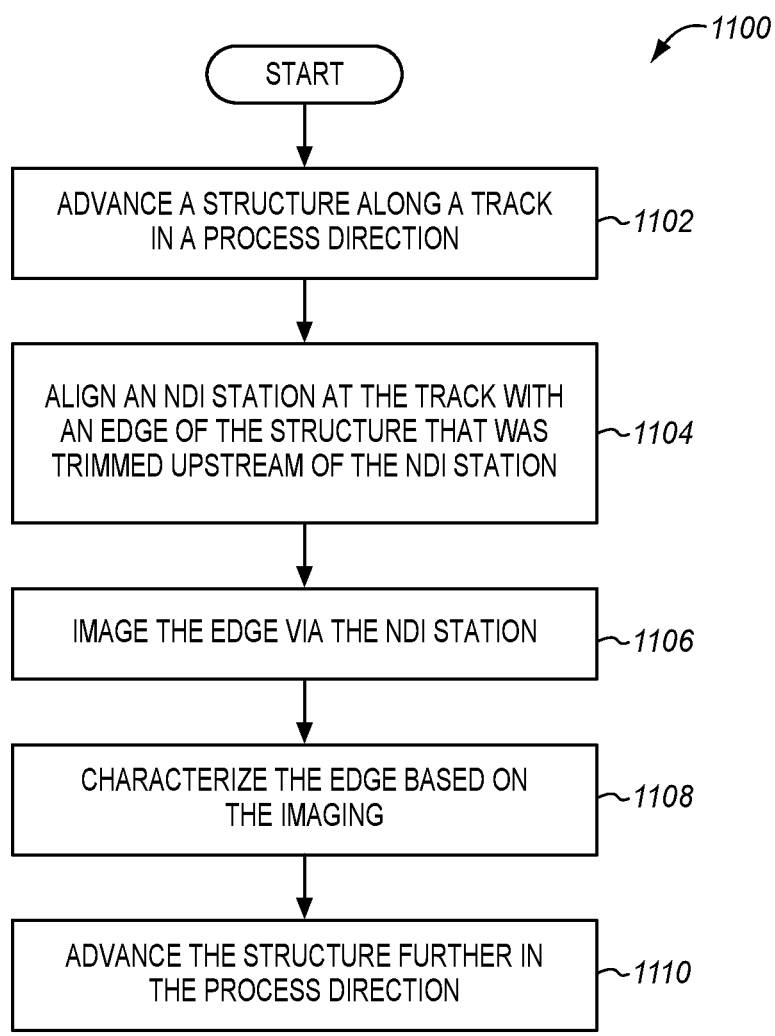
FIG. 11 is a flowchart illustrating a method for inspecting a structure in an illustrative embodiment.

FIG. 11 is a flowchart illustrating a method 1100 for inspecting a structure 120 in an illustrative embodiment. Step 1102 includes advancing a structure 120 along a track 112 in a process direction 199. In some illustrative examples, advancing the structure 120 along the track 112 in the process direction 199 comprises pulsing the structure 120 in the process direction 199. In some illustrative examples, advancing the structure 120 along the track 112 in the process direction 199 comprises moving the structure 120 continuously in the process direction 199. During advancement of the structure 120 (e.g., during a pulse), or during a pause between pulses of the structure 120, a Non-Destructive Inspection (NDI) station 180 and an edge sealing station 170 index themselves individually and/or collectively to one or more indexing features 126 at the structure 120. This enables the stations to determine their precise position relative to the structure 120, and to characterize the structure 120. In this manner, the stations are capable of performing work accurately and precisely at the structure 120, by reference to the indexing features 126. In a further embodiment, the stations perform work based on indexing performed by upstream stations. In further embodiments, other means are utilized to locate an edge (e.g., a final trimmed edge 129 or bearing edge 125) of the structure 120 being worked upon by these stations. Step 1104 includes aligning a Non-Destructive Inspection (NDI) station 180 at the track 112 with an edge of the structure 120 that was trimmed upstream of the Non-Destructive Inspection (NDI) station 180. This may be performed via the indexing techniques discussed above. Step 1106 includes imaging the edge (e.g., a final trimmed edge 129 or bearing edge 125) via the Non-Destructive Inspection (NDI) station 180. This may comprise acquiring images via a camera, via an ultrasonic transducer, or via a laser. In one embodiment, imaging the edge comprises applying ultrasonic energy to the edge. In a further embodiment, imaging the edge comprises acquiring photographic images of the edge.

In embodiments where ultrasonic transducers are used, the images depict an interior of the structure 120 without damaging the structure 120. Step 1108 includes characterizing the edge based on the imaging. For example, the Non-Destructive Inspection (NDI) station 180 may characterize the edge by identifying out-of-tolerance conditions at the edge. Step 1110 includes advancing the structure 120 further in the process direction 199.

In a further embodiment, the structure 120 is pulsed in the process direction 199, and imaging the edge is performed during pauses between pulses or during pulses. In a further embodiment, the structure 120 is moved continuously in the process direction 199, and imaging the edge is performed as the structure 120 is moved continuously.

Figure 12:
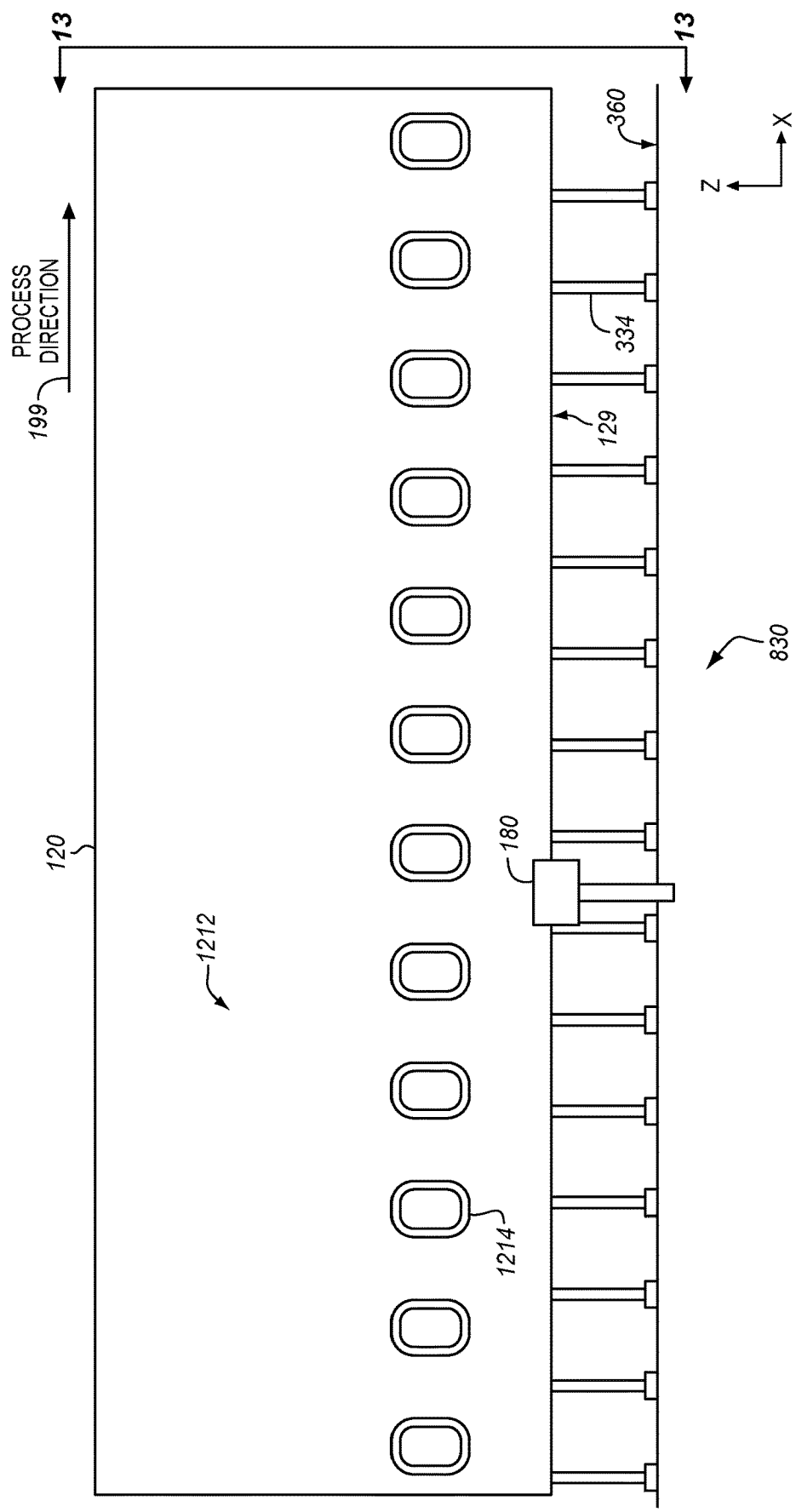
FIGS. 12-13 illustrate a Non-Destructive Inspection (NDI) station characterizing an edge of a structure in an illustrative embodiment.
Figure 13:
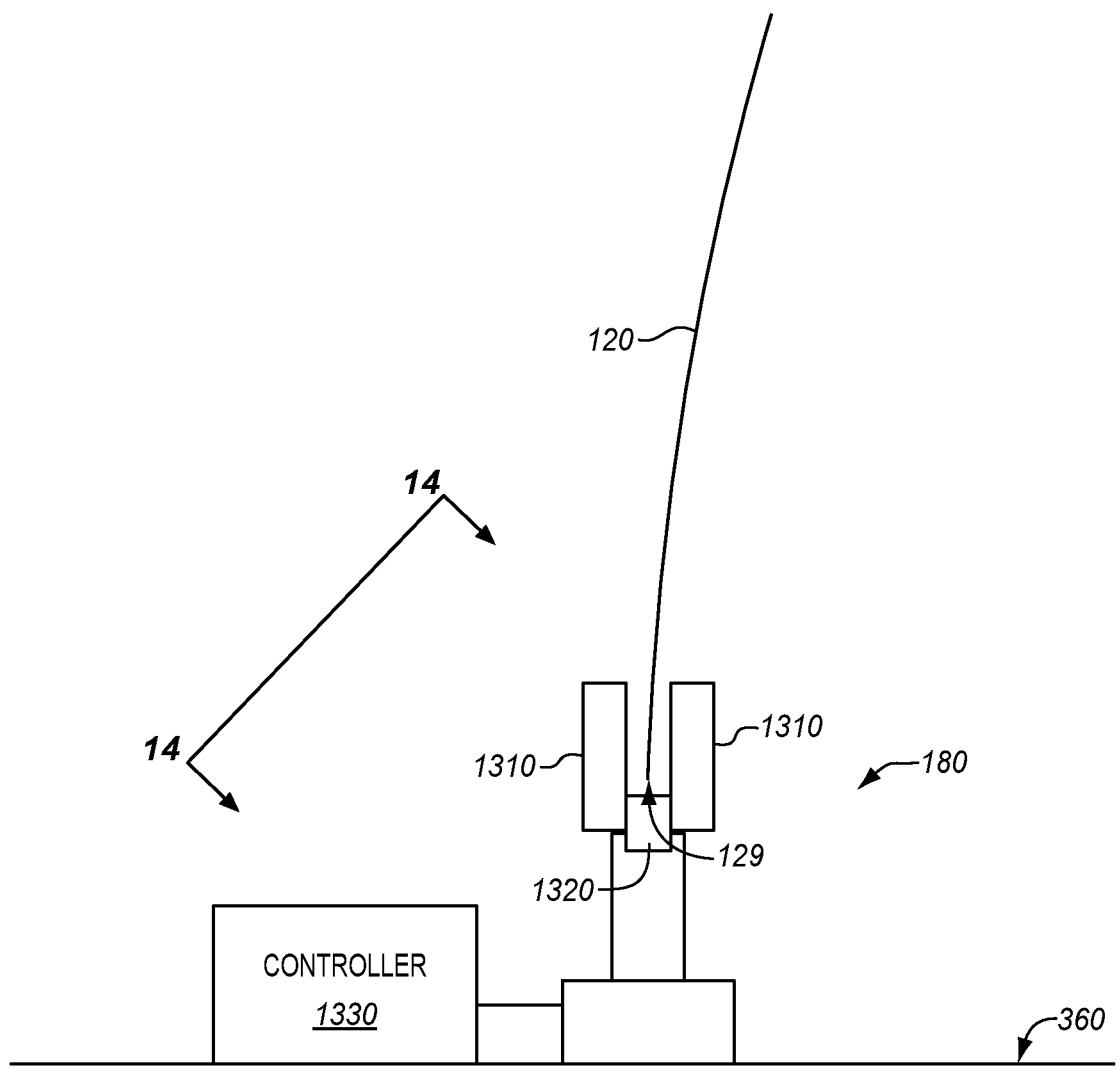

FIGS. 12-13 illustrate a Non-Destructive Inspection (NDI) station 180 characterizing an edge of a structure in an illustrative embodiment. FIG. 12 illustrates a Non-Destructive Inspection (NDI) station 180 characterizing a final trimmed edge 129 of a structure 120 having a contour 1212 and window surrounds 1214 in an illustrative embodiment. The structure 120 is carried by its edge across a track 830 comprising multiple stanchions 334 at a floor 360. The track 830 contacts final trimmed edge 129 of the structure 120 while supporting the structure 120 from the final trimmed edge 129, and that enables movement of the structure 120 in a process direction 199.

Figure 14:
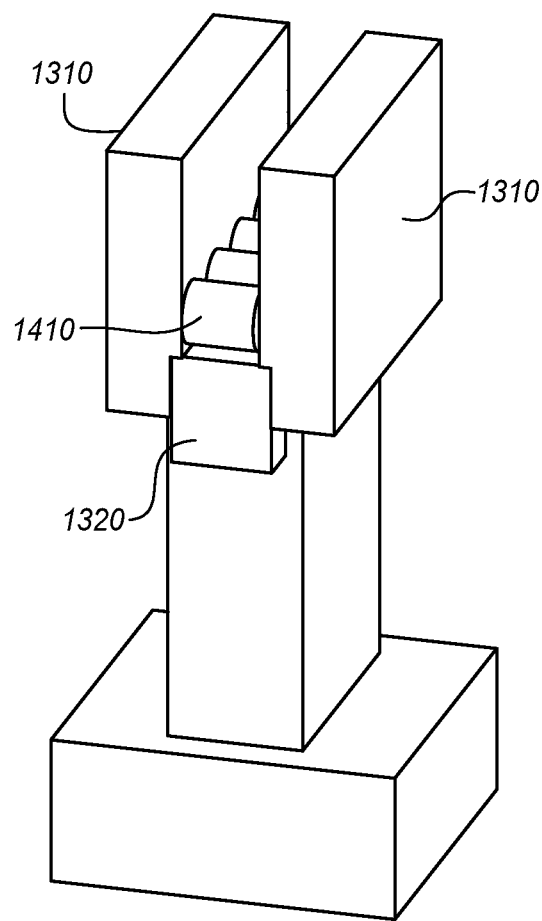
FIG. 14 is a perspective view of a Non-Destructive Inspection (NDI) station in an illustrative embodiment.

FIG. 13 corresponds with view arrows 13 of FIG. 12, and illustrates that the Non-Destructive Inspection (NDI) station 180 which includes sensors 1310 and 1320 (e.g., cameras, ultrasonic transducers that apply ultrasonic energy to the edge, lasers, etc.) which generate images of the final trimmed edge 129. A Non-Destructive Inspection (NDI) controller 1330 characterizes the final trimmed edge 129 based on images acquired by the sensors 1310 and/or 1320. For example, the Non-Destructive Inspection (NDI) controller 1330 may identify the existence of out-of-tolerance conditions at the final trimmed edge 129 based on the images. In these illustrative examples, the Non-Destructive Inspection (NDI) station 180 includes a Non-Destructive Inspection (NDI) controller 1330 that identifies out-of-tolerance conditions at the final trimmed edge 129, based on images acquired by the Non-Destructive Inspection (NDI) station 180. Input regarding the location and size of out-of-tolerance conditions may be used to determine where an edge sealing station 170 operates along the edge. FIG. 14 is a perspective view of a Non-Destructive Inspection (NDI) station 180 corresponding with view arrows 14 of FIG. 13. FIG. 14 illustrates that sensors 1320 and 1310 may be accompanied by one or more rollers 1410 which support the final trimmed edge 129 as the final trimmed edge 129 proceeds.

Figure 15:
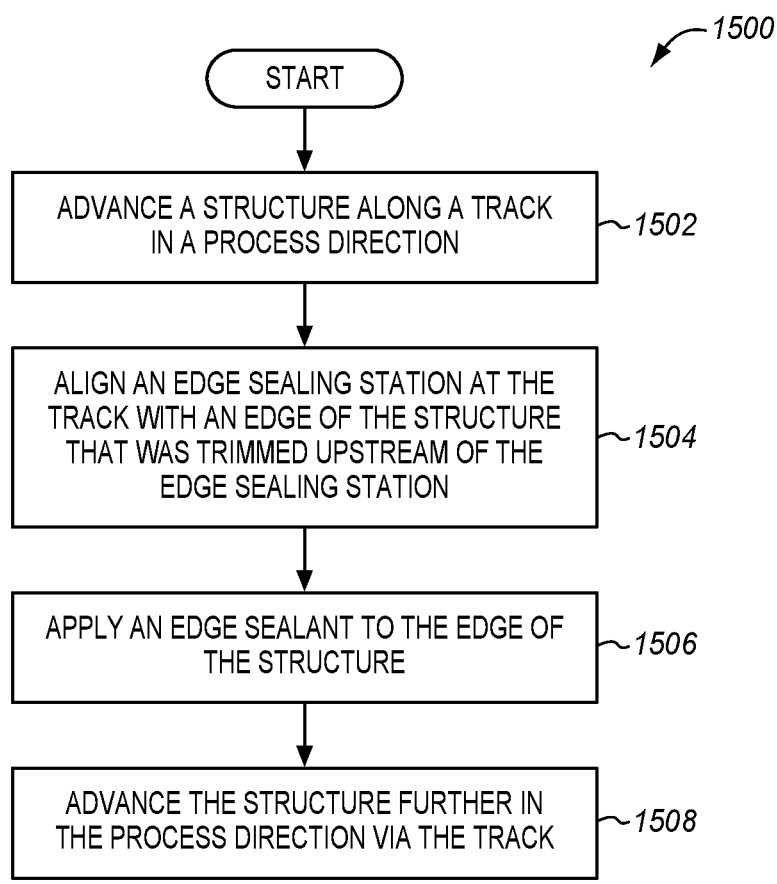
FIG. 15 is a flowchart illustrating a method for sealing an edge of a structure in an illustrative embodiment.

FIG. 15 is a flowchart illustrating a method 1500 for sealing an edge (e.g., a final trimmed edge 129) of a structure 120 in an illustrative embodiment. Step 1502 includes advancing a structure 120 along a track 830 in a process direction 199. During advancement of the structure 120 (e.g., during a pulse), or during a pause between pulses of the structure 120, a Non-Destructive Inspection (NDI) station 180 and an edge sealing station 170 index themselves individually and/or collectively to one or more indexing features 126 at the structure 120. In some illustrative examples, advancing the structure 120 along the track 830 in the process direction 199 comprises pulsing the structure 120 in the process direction 199. In some illustrative examples, advancing the structure 120 along the track 830 in the process direction 199 comprises moving the structure 120 continuously in the process direction 199. This enables the stations to determine their precise position relative to the structure 120, and to characterize the portions 127 of the structure 120 that are within the purview of the station. In this manner, the stations are capable of performing work accurately and precisely at the structure 120, by reference to the indexing features 126. In a further embodiment, the stations perform work based on indexing performed by upstream stations. In further embodiments, other means are utilized to locate an edge (e.g., a final trimmed edge 129) of the structure 120 being worked upon by these stations. Step 1504 includes aligning an edge sealing station 170 at the track 830 with an edge (e.g., a final trimmed edge 129) of the structure 120 that was trimmed upstream of the edge sealing station 170. This may be performed via the indexing techniques discussed above. Step 1506 includes applying an edge sealant 172 to the edge (e.g., a final trimmed edge 129) of the structure 120 via the edge sealing station 170. This may comprise rolling or spraying a liquid edge sealant 172, such as an epoxy, onto the edge such that out-of-tolerance conditions are filled with the edge sealant 172. In various embodiments, the edge sealant 172 is applied by an automated device or manually during pulses, during continuous advancement or during stationary periods after pulses.

Step 1508 comprises advancing the structure 120 further in the process direction 199 via the track 830.

In a further embodiment, the structure 120 is pulsed in the process direction 199, and applying the edge sealant 172 is performed during pauses between pulses or performed during pulses. In a further embodiment, the structure 120 is moved continuously in the process direction 199, and applying the edge sealant 172 is performed as the structure 120 is moved continuously. In a further embodiment, the edge sealant 172 is sprayed onto the edge (e.g., a final trimmed edge 129) of the structure 120. In a further embodiment, applying the edge sealant 172 arrests propagation of inconsistencies through the edge into the structure 120. In a further embodiment, applying the edge sealant 172 comprises applying an epoxy.

Figure 16:
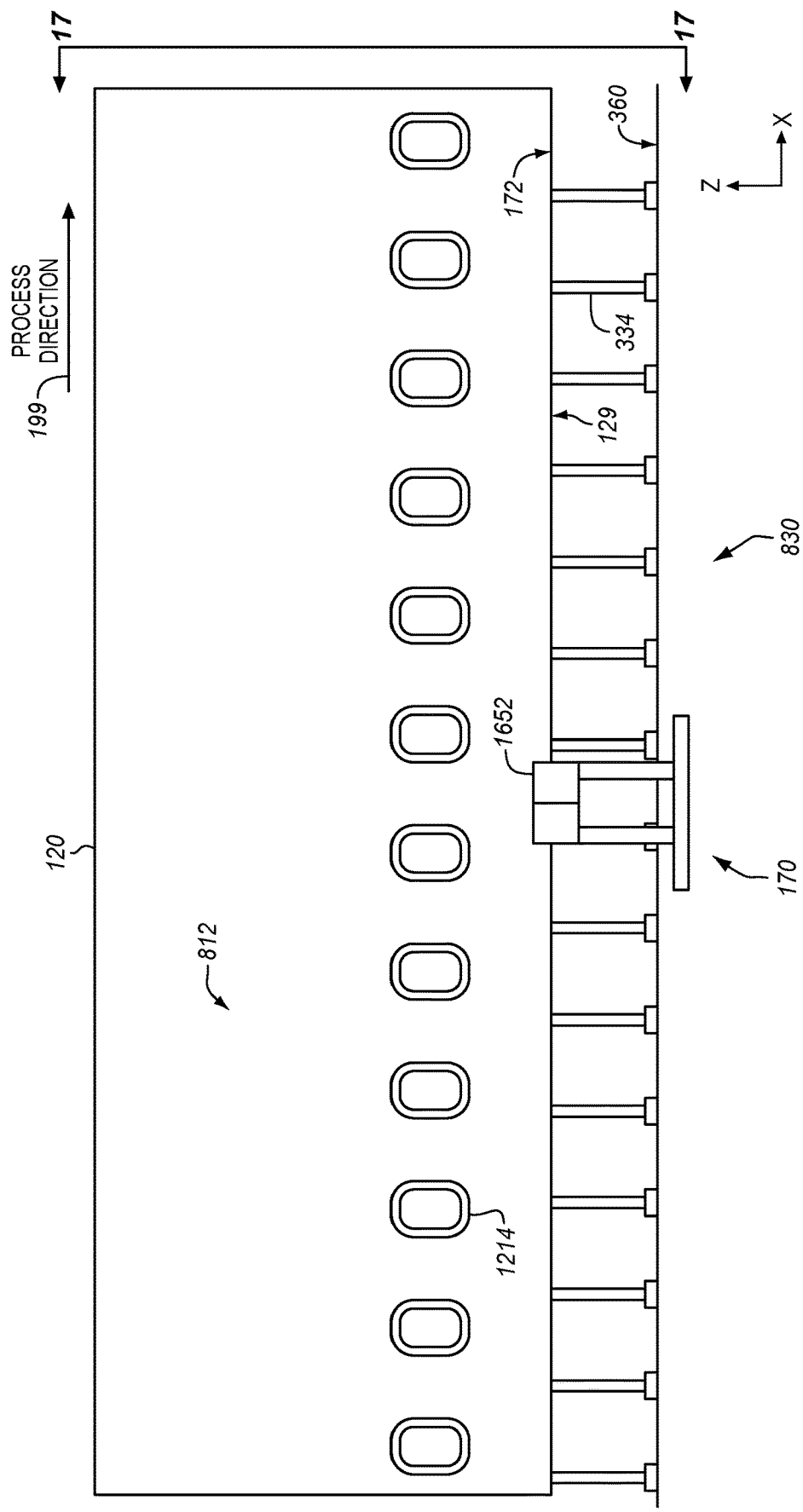
FIGS. 16-17 illustrate an edge sealing station sealing an edge of a structure in an illustrative embodiment.
Figure 17:
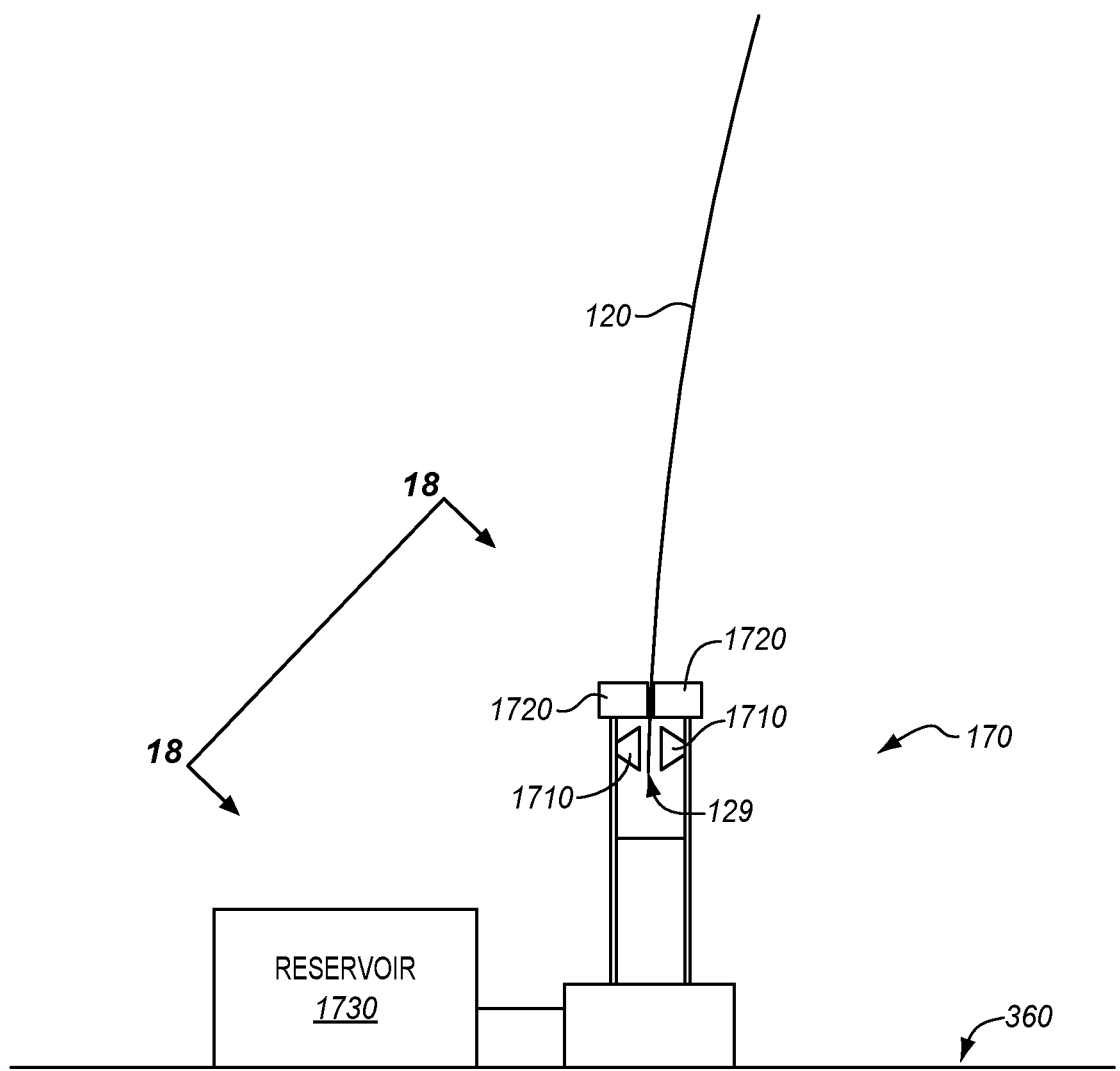

FIGS. 16-17 illustrate an edge sealing station 170 sealing final trimmed edge 129 of a structure 120 in an illustrative embodiment. FIG. 16 illustrates an edge sealing station 170 sealing final trimmed edge 129 of a structure 120 having a contour 812 and window surrounds 1214 in an illustrative embodiment. The structure 120 is carried by its final trimmed edge 129 across a track 830 in a process direction 199. The track 830 comprises multiple stanchions 334 at a floor 360. The track 830 contacts an edge of the structure 120 while supporting the structure 120 from the final trimmed edge 129, and that enables movement of the structure 120 in a process direction 199. A heater 1652 at the edge sealing station 170 heats and cures applied edge sealant 172 prior to the final trimmed edge 129 coming into contact/being carried by a next stanchion 334.

FIG. 17 corresponds with view arrows 17 of FIG. 16, and illustrates that the edge sealing station 170 includes applicators 1710 (e.g., sprayers/spray heads, rollers that apply edge sealant 172 from a reservoir, etc.) which apply edge sealant 172 (e.g., epoxy) from a reservoir 1730 to the final trimmed edge 129. Rollers 1720 are also depicted, which are powered to facilitate advancement of the structure 120.

Figure 18:
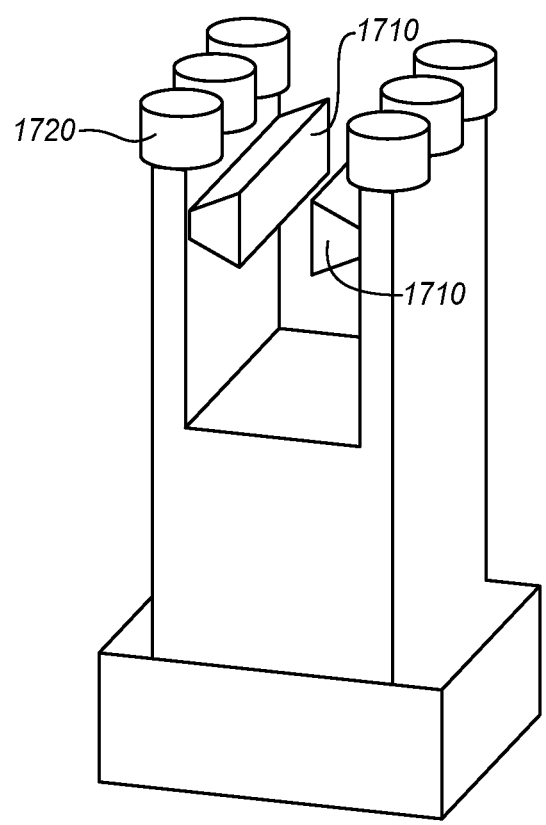
FIG. 18 is a perspective view of an edge sealing station in an illustrative embodiment.

FIG. 18 is a perspective view of an edge sealing station corresponding with view arrows 18 of FIG. 17. FIG. 18 depicts applicators 1710 as being disposed on either side of the edge, however in further embodiments the applicators 1710 are disposed beneath the edge.

Figure 19:
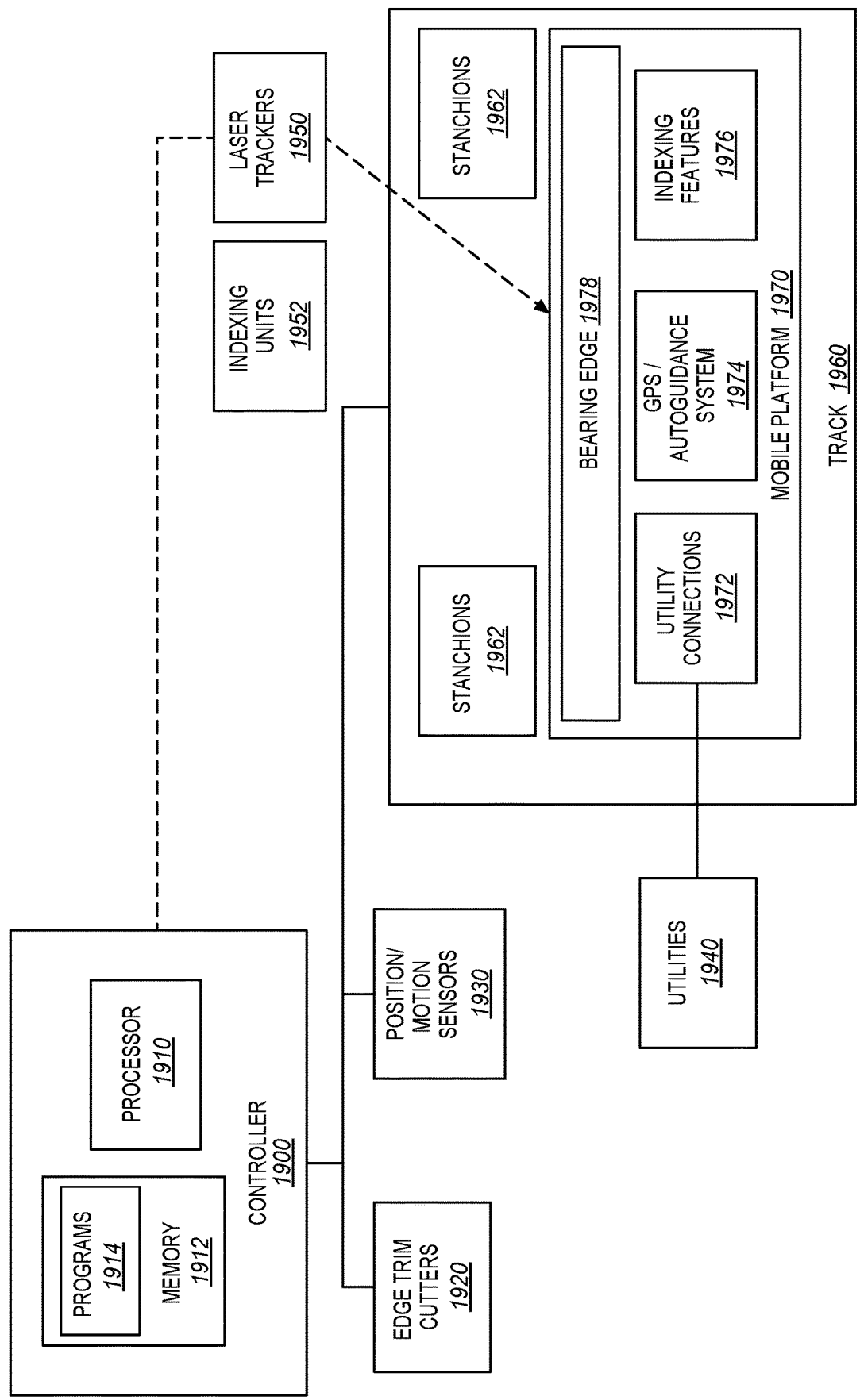
FIG. 19 is a block diagram of a control system for facilitating moving line assembly processes in an illustrative embodiment.

Attention is now directed to FIG. 19, which broadly illustrates control components of a production system that performs ultrasonic inspection. FIG. 19 is a block diagram of a control system for facilitating moving line assembly processes in an illustrative embodiment. A controller 1900 coordinates and controls operation of edge trimmer cutters 1920 and movement of one or more mobile platforms 1970 along a track 1960 having stanchions 1962 which are powered. In one embodiment, the mobile platforms 1970 comprise sections of fuselage which have one or more bearing edges 1978 that contact the stanchions 1962. The controller 1900 may comprise a processor 1910 which is coupled with a memory 1912 that stores programs 1914. In one example, the mobile platforms 1970 are driven along a track 1960 that is driven continuously by the stanchions 1962 which are powered, which is controlled by the controller 1900. In this example, the mobile platform 1970 includes utility connections 1972 which may include electrical, pneumatic and/or hydraulic quick disconnects that couple the mobile platform 1970 with externally sourced utilities 1940. In other examples, the mobile platforms 1970 comprise Automated Guided Vehicles (AGVs) that carry desired components and that include on board utilities, as well as a GPS/autoguidance system 1974. In still further examples, the movement of the mobile platform 1970 is controlled using laser trackers 1950 and indexing units 1952. The indexing units 1952 may physically interact with indexing features 1976 at the mobile platform 1970 in order to characterize the mobile platform 1970, or may utilize Radio Frequency Identifier (RFID) technology to do so. Position and/or motion sensors 1930 coupled with the controller 1900 are used to determine the position of the mobile platforms 1970 as well as the stanchions 1962.

Figure 20:
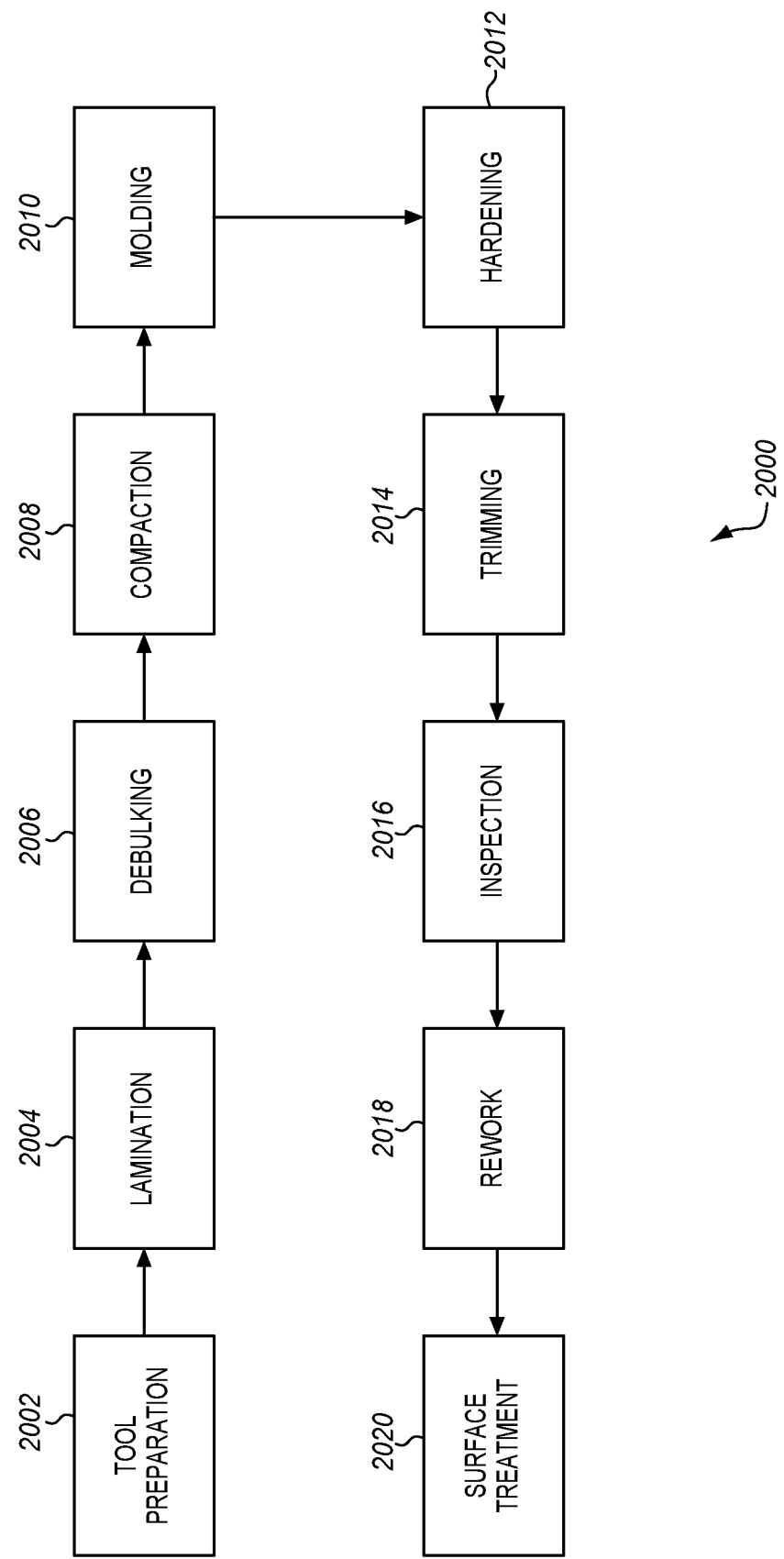
FIG. 20 is a flowchart illustrating process flow for components in a moving line in an illustrative embodiment.

Principles of the moving line described above may include other types of operations that are normally performed in the production of composite parts. FIG. 20 is a flowchart illustrating process flow for components in a moving line in an illustrative embodiment. FIG. 20 illustrates an example of a moving line 2000 that incorporates a variety of operations that may be required in the production of composite parts. For example, the moving line may include a station, zone, or stand for tool preparation 2002 involving cleaning or application of coatings to a tool, following which the tool is transported on a platform to one or locations where a preform is formed in lamination 2004. The fully laid up preform may then be delivered on a moving line to downstream locations where debulking 2006 and compaction 2008 of the preform are performed. Further, the preform may be processed in additional locations where molding 2010, hardening 2012 of the preform into a composite part, trimming 2014, inspection 2016, rework 2018 and/or surface treatment 2020 operations are performed. The various operations discussed above and throughout the specification pertaining to trimming may therefore be implemented at trimming 2014 as desired.

EXAMPLES

Figure 21:
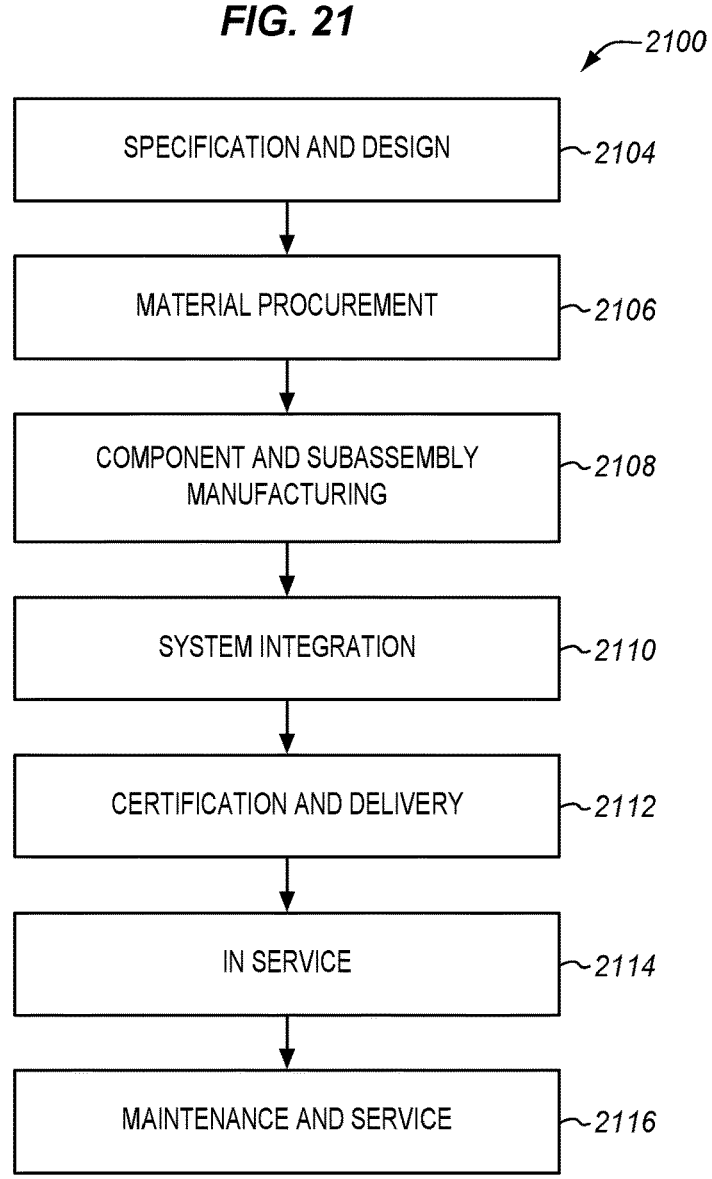
FIG. 21 is a flow diagram of aircraft production and service methodology in an illustrative embodiment.
Figure 22:
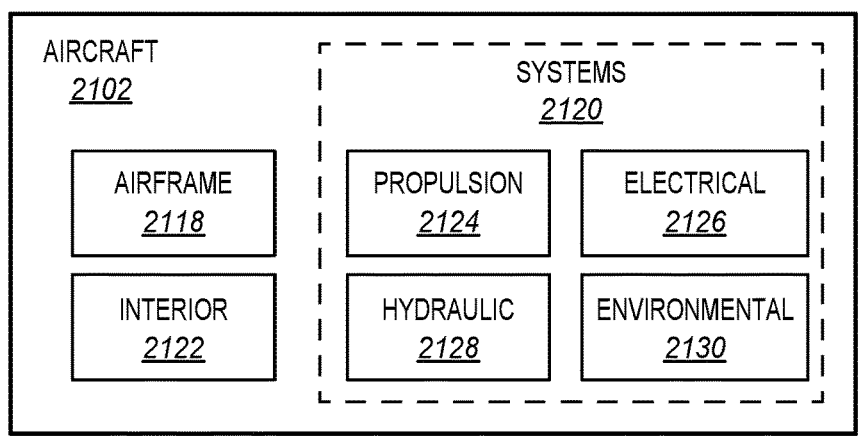
FIG. 22 is a block diagram of an aircraft in an illustrative embodiment.

Referring more particularly to the drawings, embodiments of the disclosure may be described in the context of aircraft manufacturing and service in method 2100 as shown in FIG. 21 and an aircraft 2102 as shown in FIG. 22. During pre-production, method 2100 may include specification and design 2104 of the aircraft 2102 and material procurement 2106. During production, component and subassembly manufacturing 2108 and system integration 2110 of the aircraft 2102 takes place. Thereafter, the aircraft 2102 may go through certification and delivery 2112 in order to be placed in service 2114. While in service by a customer, the aircraft 2102 is scheduled for routine work in maintenance and service 2116 (which may also include modification, reconfiguration, refurbishment, and so on). Apparatus and methods embodied herein may be employed during any one or more suitable stages of the production and service described in method 2100 (e.g., specification and design 2104, material procurement 2106, component and subassembly manufacturing 2108, system integration 2110, certification and delivery 2112, service 2114, maintenance and service 2116) and/or any suitable component of aircraft 2102 (e.g., airframe 2118, systems 2120, interior 2122, propulsion system 2124, electrical system 2126, hydraulic system 2128, environmental 2130).

Each of the processes of method 2100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 22, the aircraft 2102 produced by method 2100 may include an airframe 2118 with a plurality of systems 2120 and an interior 2122. Examples of systems 2120 include one or more of a propulsion system 2124, an electrical system 2126, a hydraulic system 2128, and an environmental system 2130. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 2100. For example, components or subassemblies corresponding to component and subassembly manufacturing 2108 may be fabricated or manufactured in a manner similar to components or subassemblies produced while the aircraft 2102 is in service 2114. Also, one or more apparatus embodiments, method embodiments, or a combination thereof may be utilized during the subassembly manufacturing 2108 and system integration 2110, for example, by substantially expediting assembly of or reducing the cost of an aircraft 2102. Similarly, one or more of apparatus embodiments, method embodiments, or a combination thereof may be utilized while the aircraft 2102 is in service 2114, for example and without limitation during the maintenance and service 2116. Thus, the invention may be used in any stages discussed herein, or any combination thereof, such as specification and design 2104, material procurement 2106, component and subassembly manufacturing 2108, system integration 2110, certification and delivery 2112, service 2114, maintenance and service 2116) and/or any suitable component of aircraft 2102 (e.g., airframe 2118, systems 2120, interior 2122, propulsion system 2124, electrical system 2126, hydraulic system 2128, and/or environmental 2130.

In one embodiment, a part comprises a portion of airframe 2118, and is manufactured during component and subassembly manufacturing 2108. The part may then be assembled into an aircraft in system integration 2110, and then be utilized in service 2114 until wear renders the part unusable. Then, in maintenance and service 2116, the part may be discarded and replaced with a newly manufactured part. Inventive components and methods may be utilized throughout component and subassembly manufacturing 2108 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for fabrication of an aircraft, the method comprising:
placing a manufacturing excess of a half-barrel section of a fuselage of the aircraft in contact with a track of a structure conveyance, the track comprising supports for receiving the manufacturing excess, the manufacturing excess disposed at a lower edge of the half-barrel section;
advancing the half-barrel section along the track in a process direction towards an edge trimming station, the track maintaining contact with and supporting the manufacturing excess of the half-barrel section as the half-barrel section proceeds along the track in the process direction; and operating the edge trimming station to remove the manufacturing excess, by moving one of: the half-barrel section in the process direction, or the edge trimming station relative to the half-barrel section in the process direction or against the process direction.

2. The method of claim 1 further comprising:
dropping scrap into a chute disposed beneath the edge trimming station.

3. The method of claim 1 wherein:
advancing the half-barrel section in the process direction exposes additional manufacturing excess to the edge trimming station.

4. The method of claim 1 wherein:
removing the manufacturing excess separates indexing features, that were utilized by upstream stations that performed work on the half-barrel section, from the half-barrel section.

5. The method of claim 1 further comprising:
bearing the half-barrel section on a second structure conveyance downstream of the edge trimming station that is taller than of a height of the structure conveyance by a height of the removed manufacturing excess.

6. The method of claim 1 further comprising:
advancing the half-barrel section along the structure conveyance in the process direction towards a fine edge trimming station; and
operating the fine edge trimming station to trim additional material from the lower edge of the half-barrel section.

7. The method of claim 1 wherein:
advancing the half-barrel section comprises pulsing the half-barrel section by less than a length of the half-barrel section; and
operating the edge trimming station comprises sliding a cutter head of the edge trimming station in the process direction.

8. The method of claim 1 wherein:
operating the edge trimming station to remove the manufacturing excess comprises removing the manufacturing excess by a fixed cutter when the half-barrel section is pulsed forward.

9. The method of claim 1 wherein:
the manufacturing excess is removed by a vertical cutter head and a cutter head operating collaboratively, the cutter head operating horizontally.

10. The method of claim 1 further comprising:
applying vertical cuts to the manufacturing excess to enable the manufacturing excess to be removed in predetermined lengths.

11. The method of claim 1 further comprising:
cutting a bearing edge into the manufacturing excess of the half-barrel section prior to placing the manufacturing excess of the half-barrel section in contact with the track of the structure conveyance, wherein the bearing edge is borne by the structure conveyance.

12. The method of claim 1 further comprising:
operating the edge trimming station and at least another edge trimming station upon the half-barrel section during a pause in advancement of the half-barrel section.

13. The method of claim 1 further comprising:
operating the edge trimming station and at least another edge trimming station upon the half-barrel section during advancement of the half-barrel section through the edge trimming stations.

14. The method of claim 1 further comprising:
operating multiple edge trimming stations upon the half-barrel section during a pause in advancement of the half-barrel section or during advancement of the half-barrel section through the multiple edge trimming stations.

15. A non-transitory computer-readable medium embodying programmed instructions which, when executed by a processor, are operable for performing a method for fabrication of an aircraft, the method comprising:
placing a manufacturing excess of a half-barrel section of a fuselage of the aircraft in contact with a track of a structure conveyance, the track comprising supports for receiving the manufacturing excess, the manufacturing excess disposed at a lower edge of the half-barrel section;
advancing the half-barrel section along the track in a process direction towards an edge trimming station, the track maintaining contact with and supporting the manufacturing excess of the half-barrel section as the half-barrel section proceeds along the track in the process direction; and
operating the edge trimming station to remove the manufacturing excess, by moving one of: the half-barrel section in the process direction or the edge trimming station relative to the half-barrel section in the process direction or against the process direction.

16. A method for fabrication of an aircraft, the method comprising:
placing a manufacturing excess of a half-barrel section of a fuselage of the aircraft in contact with a first track of a structure conveyance, the track includes supports for receiving the manufacturing excess, the manufacturing excess disposed at a lower edge of the half-barrel section;
advancing the half-barrel section along the first track in a process direction towards an edge trimming station, the track maintaining contact with and supporting the manufacturing excess of the half-barrel section as the half-barrel section proceeds along the track;
operating the edge trimming station to remove the manufacturing excess and create a trimmed edge of the half-barrel section as the half-barrel section advances along the first track or during a pause in the advancement of the half-barrel section along the first track; and
advancing the trimmed edge of the half-barrel section along a second track of the structure conveyance in the process direction downstream of the edge trimming station, the trimmed edge bearing on the second track as the half-barrel section proceeds along the second track.

17. The method of claim 16 wherein the structure conveyance comprises a first set of stanchions and a second set of stanchions arranged in the process direction and the second set of stanchions disposed downstream of the edge trimming station are taller than the first set of stanchions disposed upstream of the edge trimming station.

18. The method of claim 16 further comprising:
dropping scrap into a chute disposed beneath the edge trimming station.

19. The method of claim 18 wherein the scrap comprises portions of the manufacturing excess that were removed.

20. The method of claim 16 wherein advancing the half-barrel section along the first track in the process direction exposes additional manufacturing excess to the edge trimming station.

21. The method of claim 16 wherein removing the manufacturing excess separates indexing features, that were utilized by upstream stations that performed work on the half-barrel section, from the half-barrel section.

22. The method of claim 16 further comprising:
   advancing the trimmed edge of the half-barrel section along the second track in the process direction towards a fine edge trimming station; and
   operating the fine edge trimming station to trim additional material from the trimmed edge of the half-barrel section.

23. The method of claim 16 wherein operating the edge trimming station comprises sliding a cutter head of the edge trimming station in the process direction.

24. The method of claim 16 wherein the manufacturing excess is removed by a vertical cutter head and a cutter head of the edge trimming station operating collaboratively, the cutter head operating horizontally.

25. The method of claim 16 further comprising:
   applying vertical cuts to the manufacturing excess to enable the manufacturing excess to be removed in predetermined lengths.

26. The method of claim 16 further comprising:
   cutting a bearing edge into the manufacturing excess of the half-barrel section prior to placing the manufacturing excess of the half-barrel section in contact with the first track of the structure conveyance, wherein the bearing edge is borne by the structure conveyance.

* * * * *